(12) United States Patent
Okuyama et al.

(10) Patent No.: US 10,700,756 B2
(45) Date of Patent: Jun. 30, 2020

(54) USER EQUIPMENT AND BASE STATION

(71) Applicant: NTT DOCOMO, INC., Tokyo (JP)

(72) Inventors: Tatsuki Okuyama, Tokyo (JP); Satoshi Suyama, Tokyo (JP); Tatsunori Obara, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/769,390

(22) PCT Filed: Feb. 1, 2017

(86) PCT No.: PCT/JP2017/003605
§ 371 (c)(1),
(2) Date: Apr. 19, 2018

(87) PCT Pub. No.: WO2017/135305
PCT Pub. Date: Aug. 10, 2017

(65) Prior Publication Data
US 2018/0331746 A1    Nov. 15, 2018

(30) Foreign Application Priority Data
Feb. 5, 2016  (JP) .................................. 2016-021370

(51) Int. Cl.
*H04B 7/06*    (2006.01)
*H04W 16/28*    (2009.01)
(Continued)

(52) U.S. Cl.
CPC .......... *H04B 7/0695* (2013.01); *H04B 7/024* (2013.01); *H04B 7/063* (2013.01); *H04B 7/065* (2013.01);
(Continued)

(58) Field of Classification Search
CPC .... H04B 7/0632; H04B 7/0626; H04B 7/063; H04B 7/0695; H04B 7/0456;
(Continued)

(56) References Cited

U.S. PATENT DOCUMENTS

| 8,543,063 B2 | 9/2013 | Bergel et al. |
| 2011/0085448 A1 | 4/2011 | Kuwahara |

(Continued)

FOREIGN PATENT DOCUMENTS

| CN | 102405603 A | 4/2012 |
| JP | 2013-232741 A | 11/2013 |
| JP | 2014-027368 A | 2/2014 |

OTHER PUBLICATIONS

International Search Report issued in PCT/JP2017/003605 dated Mar. 28, 2017 (2 pages).

(Continued)

*Primary Examiner* — David C Payne
*Assistant Examiner* — Sarah Hassan
(74) *Attorney, Agent, or Firm* — Osha Liang LLP

(57) ABSTRACT

A user equipment UE includes: a measurer that measures, for each of a plurality of candidate beams, a benchmark pertaining to communication quality; a comparer that compares the benchmark with a first threshold value and a second threshold value; and a feedback unit that transmits the benchmark to the base station as feedback information pertaining to an interference beam if the benchmark is the first threshold value or higher and lower than the second threshold value, transmits the benchmark to the base station as feedback information pertaining to a desired beam if the benchmark is the second threshold value or higher, and transmits no feedback information to the base station if the benchmark is lower than the first threshold value, based on the comparison results of the comparer.

9 Claims, 17 Drawing Sheets

(51) Int. Cl.
| | |
|---|---|
| *H04W 24/10* | (2009.01) |
| *H04B 17/318* | (2015.01) |
| *H04B 17/336* | (2015.01) |
| *H04L 5/00* | (2006.01) |
| *H04B 17/345* | (2015.01) |
| *H04W 72/04* | (2009.01) |
| *H04J 11/00* | (2006.01) |
| *H04B 7/024* | (2017.01) |
| *H04W 72/08* | (2009.01) |
| *H04B 7/04* | (2017.01) |
| *H04B 17/24* | (2015.01) |
| *H04B 7/10* | (2017.01) |

(52) U.S. Cl.
CPC ......... *H04B 7/0617* (2013.01); *H04B 7/0619* (2013.01); *H04B 7/0626* (2013.01); *H04B 7/0632* (2013.01); *H04B 7/0645* (2013.01); *H04B 17/318* (2015.01); *H04B 17/336* (2015.01); *H04B 17/345* (2015.01); *H04J 11/0053* (2013.01); *H04L 5/0073* (2013.01); *H04W 16/28* (2013.01); *H04W 24/10* (2013.01); *H04W 72/046* (2013.01); *H04W 72/0426* (2013.01); *H04W 72/082* (2013.01); *H04B 7/04* (2013.01); *H04B 7/10* (2013.01); *H04B 17/24* (2015.01)

(58) Field of Classification Search
CPC .. H04B 7/0486; H04B 7/0413; H04B 7/0619; H04B 17/24; H04B 17/345; H04B 7/0658
USPC .......................................... 375/260; 370/312
See application file for complete search history.

(56) References Cited

U.S. PATENT DOCUMENTS

2014/0307654 A1* 10/2014 Kim ..................... H04B 7/0617
370/329
2017/0033898 A1* 2/2017 Chun .................... H04L 5/005

OTHER PUBLICATIONS

Written Opinion of the International Searching Authority issued in PCT/JP2017/003605 dated Mar. 28, 2017 (3 pages).
Extended European Search Report issued in counterpart European Patent Application No. 17747461.6, dated Jan. 7, 2019 (8 pages).
Office Action issued in the counterpart Chinese Patent Application No. 201780005889.4, dated Dec. 13, 2019 (12 pages).

* cited by examiner

USER EQUIPMENT AND BASE STATION

TECHNICAL FIELD

The present invention pertains to a user equipment and a base station.

BACKGROUND ART

In the field of radio communication, there has been actively employed in recent years MIMO (multiple-input and multiple-output) technology, in which speed and quality of signal transmission are improved by carrying out transmission/reception using a plurality of antennas on the transmitter side and receiver side. MIMO technology includes SU-MIMO (single user MIMO) for a single user (receiver), and MU-MIMO (multiple user MIMO) for a plurality of users (receivers).

Further, there is known in the art (for example, Patent Document 1) a massive-MIMO transmission scheme in which there is used a large number of antenna elements so as to achieve a further increase in speed and a reduction in interference in signal transmission, (for example, 100 elements or more) in a high-frequency band (for example 10 GHz or more), and use of which also enables miniaturization of antennas and a wide bandwidth to be attained.

With massive-MIMO, there can be achieved advanced beamforming (BF) by use of a large number of antenna elements, compared to conventional MIMOs. Beamforming is a technology for controlling a directivity and/or shape of beams (transmission beams corresponding to transmission antennas, or reception beams corresponding to reception antennas) by use of a plurality of antenna elements. With MIMO, phase and amplitude can be controlled for each antenna element, thus the larger the number of antenna elements used, the greater the degree of freedom of beam control.

As one mode of beamforming, fixed beamforming is exemplified. In fixed beamforming, a beamforming weight (fixed beam) to be used is selected from among a plurality of beamforming weights prepared in advance. In fixed beamforming, beamforming that controls fixed beams and coding that achieves compensation for multiplexing between a plurality of streams (transmission-side precoding and reception-side postcoding) are carried out separately. For coding that achieves compensation for multiplexing between a plurality of streams, it is necessary for a user equipment to feedback various information to a base station.

However, with MU-MIMO, as the number of user equipments that performs communication simultaneously increases, an amount of feedback information also increases. Patent document 2 discloses a feature in which the RSSI of a signal from a base station is measured in a user equipment, and if it is determined that the RSSI is a threshold value or higher, the channel state is estimated and the channel state information is fed back to the base station, and if it is determined that the RSSI value is lower than the threshold value, channel state information is not fed back to the base station. According to this feature, the amount of information fed back from the user equipment to the base station can be reduced.

RELATED ART DOCUMENT

Patent Documents

Patent Document 1: Japanese Patent Application Laid-Open Publication No. 2013-232741

Patent Document 2: Japanese Patent Application Laid-Open Publication No. 2014-27368

SUMMARY OF THE INVENTION

Problem to be Solved by the Invention

In MU-MIMO, beamforming and coding differ according to whether transmission beams from a base station are treated as interference beams or desired beams in a user equipment.

However, in the conventional technique, even if an amount of information fed back from a user equipment were able to be reduced, it would nonetheless be necessary to determine, at the base station, whether the transmission beams were interference beams or desired beams based on information fed back from the user equipment. Thus, a problem exists in that feedback transmitted from a plurality of user equipments generates a large processing load at the base station.

In consideration of the above-stated matters, an object of the present invention is to reduce a processing load at the base station while reducing an amount of feedback information in MU-MIMO.

Means of Solving the Problems

A user equipment of the present invention receives a plurality of candidate beams for transmit beamforming, which are transmitted from a base station that carries out radio communication by using an MU-MIMO transmission scheme, and the user equipment includes: a measurer configured to measure a benchmark pertaining to communication quality for each of the plurality of candidate beams; a comparer configured to compare the benchmark with a first threshold value and a second threshold value that is greater than the first threshold value; and a feedback unit configured to transmit the benchmark to the base station as feedback information pertaining to an interference beam if the benchmark is the first threshold value or higher and lower than the second threshold value, transmit the benchmark to the base station as feedback information pertaining to a desired beam if the benchmark is the second threshold value or higher, and transmit no feedback information to the base station if the benchmark is lower than the first threshold value, based on the comparison results of the comparer.

A base station of the present invention is radio communicable with a plurality of the user equipment by using an MU-MIMO transmission scheme, and the base station includes: a precoder configured to carry out digital precoding with respect to M (M is an integer of 2 or higher) by using a precoding weight matrix; a transmission beamformer configured to subject a signal, which has been subjected to the digital precoding, to transmit beamforming that imparts variation in phase and amplitude corresponding to a transmit beamforming weight matrix; a plurality of antennas for transmitting signals that have been subjected to the transmit beamforming, and receiving the feedback information transmitted from each of the plurality of the user equipments; and a transmit beamforming weight controller configured to control the transmission beamformer, and the transmit beamforming weight controller selects a transmit beamforming weight matrix corresponding to each of the plurality of candidate beams, to make the transmission beamformer carry out transmit beamforming that imparts variation in phase and amplitude corresponding to the selected transmit beamforming weight matrix, and determines a transmit beamforming weight matrix for transmitting M streams based on the feedback information corresponding to each of the plurality of the user equipments, to make the transmission beamformer carry out transmit beamforming that imparts variation in phase and amplitude corresponding to the determined transmit beamforming weight matrix.

Effect of the Invention

According to the present invention, the processing load in the base station is reduced, and the amount of feedback information also is reduced.

MODES FOR CARRYING OUT THE INVENTION

1. Embodiment 1 (1). Massive-MIMO Transmission

Following is an explanation of a massive-MIMO transmission scheme according to an embodiment of the present invention. In this massive-MIMO transmission scheme, a base station carries out radio communication by using a plurality of transmission antennas $A_T$, and multiplexing is performed to achieve a high radio communication speed (data rate). Further, since a degree of freedom of antenna control is increased when carrying out beamforming due to use of a large number of transmission antennas $A_T$, more advanced beamforming is achieved as compared to the conventional technique. Accordingly, interference reduction and/or effective use of radio resources are achieved.

The number of transmission antennas $A_T$ provided at a base station adapted for massive-MIMO is preferably 32 or more, 64 or more, 96 or more, 100 or more, 128 or more, 192 or more, 200 or more, 256 or more, 500 or more, 512 or more, 1000 or more or 1024 or more, but the number is not limited thereto.

A high-frequency band (for example, a frequency band of 10 GHz or higher) is preferably used in massive-MIMO transmission schemes. Use of a high-frequency band enables a wide bandwidth to be secured (for example, 200 MHz or more) for radio resources, in contrast to use of a low-frequency band. Since the size of an antenna element is proportional to a wavelength of a signal, it is possible to further miniaturize antennas when using a high-frequency band in which the wavelengths of radio signals are relatively short. On the other hand, the higher a frequency is, the greater an increase in propagation loss is. Thus, even when, for example, radio signals are transmitted from a base station with the same transmission power, use of a high-frequency band results in a drop in reception signal strength at a mobile station as compared to when a low-frequency band is used.

Figure 1:
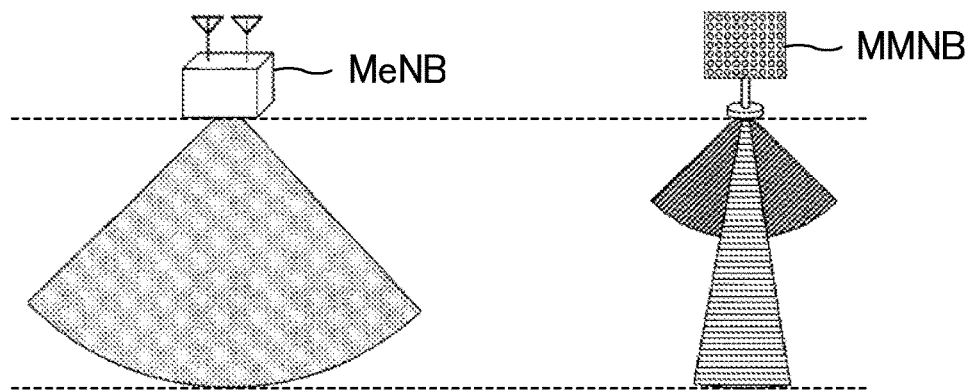
FIG. 1 is a drawing explaining an outline of the massive-MIMO transmission scheme according to an embodiment.

A drop in reception signal strength due to use of a high-frequency band described above can be compensated for by employing beamforming gain. FIG. 1 is a schematic drawing indicating a reachable range of a beam (radio signal) according to frequency. Conventional base stations (macro base station MeNB) perform radio communication by using low-frequency bands, thus the beams reach further even in a case when beams with wide radiation patterns are used.

Meanwhile, the base station (small base station MMNB) compatible with the massive-MIMO transmission scheme of the present embodiment performs radio communication by using a high-frequency band, resulting in a short beam reaching distance compared to a macro base station MeNB when a beam having a wide radiation pattern is used. However, when the width of a beam radiation pattern is reduced by beamforming, it is possible to increase a distance reached by a beam even if a small base station MMNB in which a high-frequency band is used.

Figure 2:
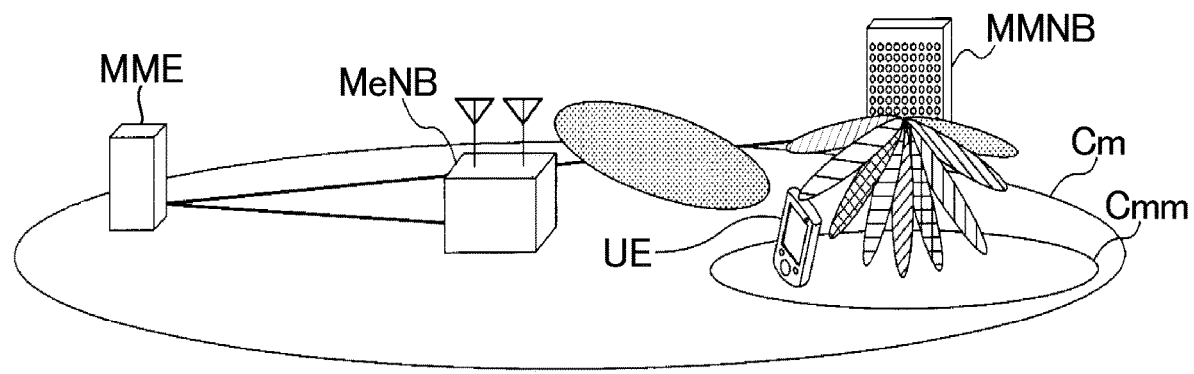
FIG. 2 is a schematic block diagram of a radio communication system according to the embodiment.

FIG. 2 is a schematic block diagram of a radio communication system 1 according to the embodiment. Radio communication system 1 comprises a macro base station MeNB, a small base station MMNB, a central control station MME, and a user equipment UE. The small base station MMNB is compatible with the massive-MIMO transmission scheme.

The macro base station MeNB has macro cells Cm formed on the surroundings thereof, and the small base station MMNB has massive-MIMO cells (MM cell) Cmm formed on the surroundings thereof. The frequency band (for example, a 10 GHz band) used in the small base station MMNB has a higher frequency and greater propagation loss compared to a frequency band (for example, a 2 GHz band) used in the macro base station MeNB, thus the cell size of MM cell Cmm is smaller than the cell size of Macro cell Cm. Accordingly, the small base station MMNB and user equipment UE are likely to be connected via line-of-sight.

As indicated in FIG. 2, it is possible for MM cell Cmm to overlap with an area in which radio communication can be achieved by using another radio access technology (RAT) such as macro cell Cm. As a result, with respect to user equipment UE positioned in an overlapping region, support exists for multiple connectivity under a plurality of radio access technologies.

Further, a control signal can be transmitted, from macro base station MeNB that is compatible with different radio access technology, to user equipment UE that is currently in communication with small base station MMNB compatible with the massive-MIMO transmission scheme. Another example of radio access technology that can be cited is a public or local wireless LAN.

As such, in massive-MIMO transmission in which a high-frequency band is used, it is preferable to compensate for propagation loss by way of a gain achieved by beamforming. To achieve radio communication at a high speed, preferably a plurality of data streams are spatially multiplexed and transmitted. In such a multiplex transmission, it is preferable not only for a beam to be controlled by beamforming, but also for inter-stream multiplexing to be compensated for by use of precoding.

Figure 3:
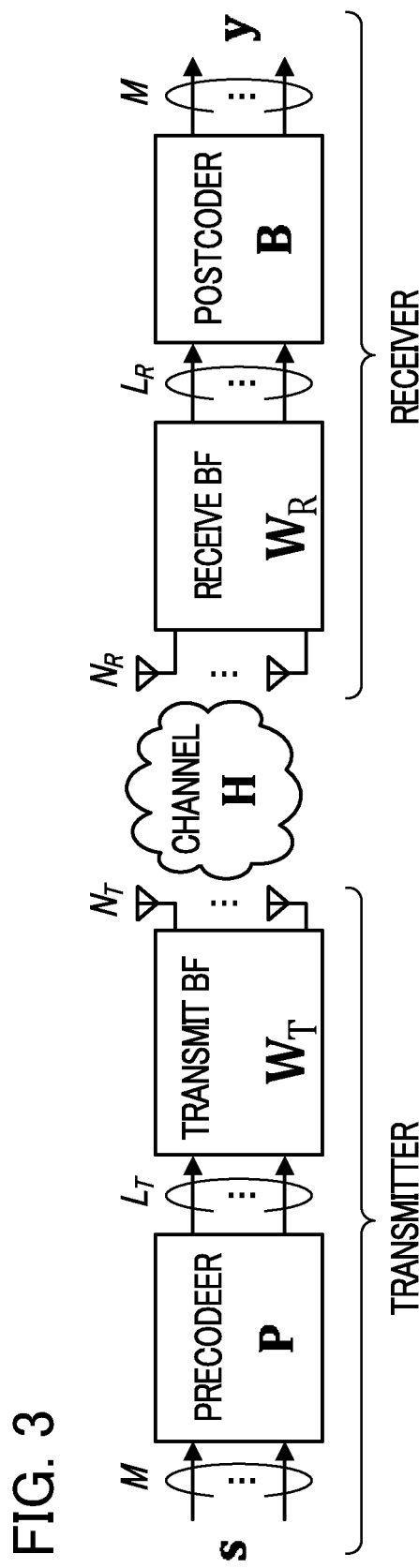
FIG. 3 is a drawing illustrating a functional configuration of massive-MIMO transmission according to the embodiment.

FIG. 3 is a drawing illustrating one example of a transmitter/receiver configuration in massive-MIMO in which fixed beamforming is adopted. FIG. 3 illustrates a configuration based on SU-MIMO in which there exists a single transmitter and a single receiver. The precoder and transmission beamformer of the transmitter (for example, small base station MMNB) respectively carry out precoding and transmit beamforming, and the reception beamformer and postcoder of the receiver (for example, user equipment UE) respectively carry out receive beamforming and postcoding.

Mathematically, a precoding process is a process in which an M-by-1 signal vector s representing M (M is an integer of 1 or higher; M=16, for example) streams is multiplied by (an) $L_T$-by-M ($L_T$ is the number of transmission beams) precoding matrix P. A transmit beamforming process is a process in which a signal that has been subjected to precoding is multiplied by an $N_T$-by-$L_T$ ($N_T$ is the number of transmission antennas; $N_T$=256, for example) transmit BF (beamforming) weight matrix $W_T$. After transmit beamforming, a signal transmitted from a transmission antenna $A_T$ is multiplied by an $N_R$-by-$N_T$ ($N_R$ is the number of reception antennas; $N_R$=16, for example) channel matrix H corresponding to the spatial propagation. A receive beamforming process is a process in which a signal received by a reception antenna $A_R$ is multiplied by an $L_R$-by-$N_R$ ($L_R$ is the number of reception beams) receive BF weight matrix $W_R$. A postcoding process is a process in which a signal that has been subjected to receive beamforming is multiplied by an M-by-$L_R$ postcoding matrix B. In light of the above-stated matter, an M-by-1 signal vector y after postcoding is expressed by the following formula. $y=BW_R HW_T Ps+Bz$. Here, the additional z included in the above-stated formula is an $L_R$-by-1 noise vector.

Figure 4:
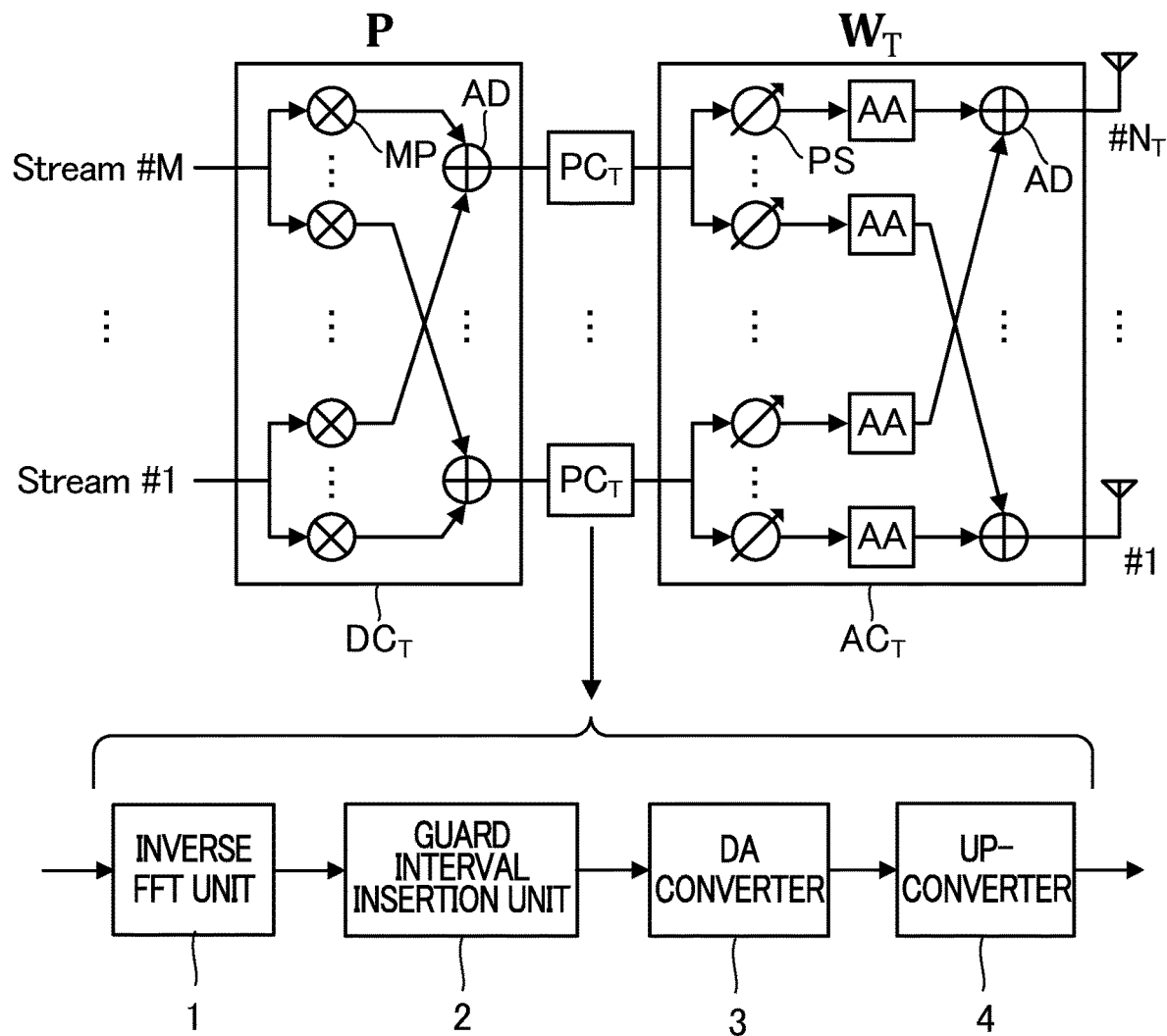
FIG. 4 is a drawing illustrating an example circuit configuration of a transmitter according to the embodiment.
Figure 5:
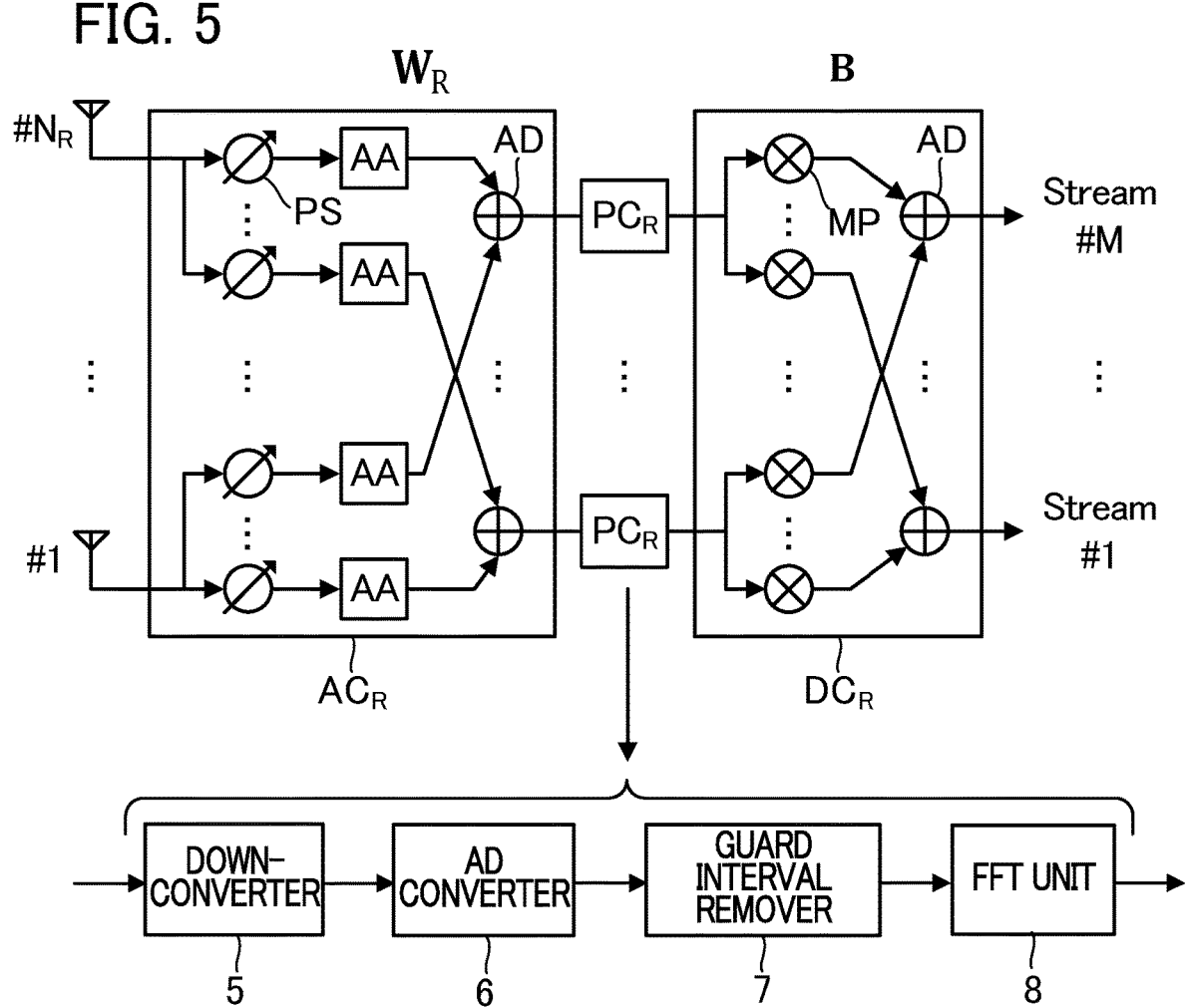
FIG. 5 is a drawing illustrating an example circuit configuration of a receiver according to the embodiment.

As a more suitable mode for massive-MIMO transmission in the present embodiment, digital precoding is adopted as the precoding, while analog fixed beamforming or digital fixed beamforming in a time domain is adopted as the transmit/receive beamforming, and digital postcoding is adopted as the postcoding. Each of FIGS. 4 and 5 illustrates, in a non-limiting manner, an example of a specific circuit configuration when analog fixed beamforming is adopted. FIG. 4 illustrates a transmitter-side equalizing circuit, and FIG. 5 illustrates a receiver-side equalizing circuit. The transmission-side equalizing circuit corresponds to an equalizing circuit of the base station for downlink, for example, and the receiver-side equalizing circuit corresponds to an equalizing circuit of the user equipment for the downlink, for example.

As illustrated in FIG. 4, at the transmitter side, M streams are subjected to digital precoding (matrix calculation) by use of a digital signal processing circuit $DC_T$ having a plurality of multipliers MP and adders AD, and subsequently, a processing circuit $PC_T$ generates a high-frequency transmission signal.

Processing circuit $PC_T$ comprises an inverse FFT unit 1 for subjecting the output signals of digital signal processing circuit $DC_T$ to inverse high-speed Fourier transformation, a guard interval insertion unit 2 for inserting a guard interval to the output signals of inverse FFT unit 1, and a digital-to-analog converter 3 for subjecting the output signals of guard interval insertion unit 2 to digital-to-analog conversion, and an up-converter 4 for up-converting the output signals of digital-to-analog converter 3 and outputting high-frequency transmission signals.

The high-frequency transmission signal is subjected to variation in phase and amplitude (in other words, is subjected to analog transmit beamforming) by an analog signal processing circuit $AC_T$ having a plurality of variable phase shifters PS and/or amplitude adjusters AA, and an adder AD, and is subsequently transmitted from $N_T$ transmission antennas $A_T$.

As illustrated in FIG. 5, on the receiver side, a high-frequency reception signal received by $N_R$ reception antennas $A_R$ is subjected to variation in phase and amplitude (in other words, is subjected to analog receive beamforming) by an analog signal processing circuit $AC_R$ having a plurality of variable phase shifters PS, amplitude adjusters AA, and adders AD. Subsequently, processing circuit $PC_R$ subjects signals that have been subjected to receive beamforming to signal processing. Processing circuit $PC_R$ comprises a down-converter 5 for down-converting the output signals of analog signal processing circuit $AC_R$, an analog-to-digital converter 6 for subjecting the output signals of down-converter 5 to AD conversion, a guard interval remover 7 for removing the guard interval from the output signals of analog-to-digital converter 6, and an FFT unit 8 for subjecting the output signals of guard interval remover 7 to high-speed Fourier conversion. Digital signal processing circuit $DC_R$ subjects the output signals of processing circuit $PC_R$ to digital postcoding (matrix operation), and generates (regenerates) M streams.

The above-stated configuration is especially suited to a massive-MIMO transmission scheme in which the number $N_T$ of transmission antennas is sufficiently large with respect to the number M of streams to be transmitted (in other words, $M \ll N_T$). Generally, when the number $N_T$ of transmission antennas is greater than the number M of transmission streams, prior to transmission of a radio signal, it is necessary to carry out an $N_T$-by-M matrix calculation, by which M stream components are converted into $N_T$ transmission antenna components. In the present embodiment, in mathematical terms, M stream components are converted into $N_T$ transmission antenna components by matrix calculation by means of an $L_T$-by-M precoding matrix P and an $N_T$-by-$L_T$ transmit BF weight matrix T, as described above.

In the above-stated configuration, only precoding is carried out by digital signal processing circuit $DC_T$ on the transmission side. Therefore, compared to a configuration in which precoding and transmit beamforming are digitally processed, the circuit size and computational complexity of digital signal processing circuit $DC_T$ can be reduced, and the number of digital-to-analog converters 3 (processing circuits $PC_T$) can be reduced. Accordingly, simplification of the configuration and use of a large number of transmission antennas $A_T$ can be achieved simultaneously. The same applies to the reception side (postcoding and receive beamforming). When digital fixed beamforming is adopted, the digital beamformer that forms the $W_T$ is inserted into the rear stage of guard interval insertion unit 2 in FIG. 4, and the digital beamformer that forms $W_R$ is inserted into the rear stage of analog-to-digital converter 6 in FIG. 5.

1. (2) Multiple User MIMO (MU-MIMO)

Figure 6:
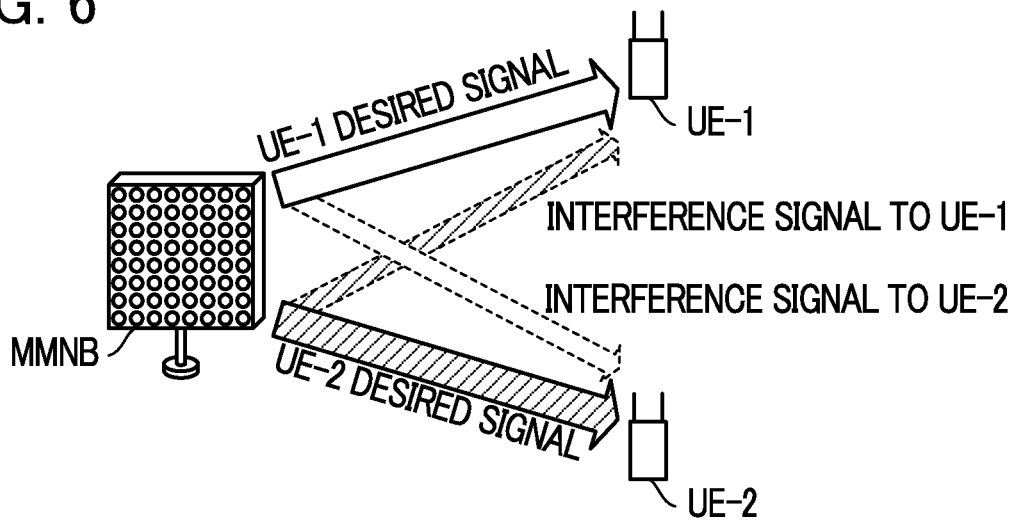
FIG. 6 is a conceptual diagram of MU-MIMO according to the embodiment.

Following is an explanation of MU-MIMO according to the embodiment of the present invention. FIG. 6 is a conceptual diagram of MU-MIMO. In MU-MIMO, small base station MMNB, which is a single MIMO base station, simultaneously transmits multiplexed signals to a plurality of user equipments UE by using a plurality of transmission antennas $A_T$. That is, the MIMO base station can perform radio communication simultaneously with a plurality of users by user multiplexing. With MU-MIMO, channel correlation between a plurality of users is reduced, and the overall communication speed of all user equipments UE is thereby improved.

Meanwhile, as illustrated in FIG. 6, interference occurs between a plurality of users due to user multiplexing. For example, a desired signal with respect to a first user equipment UE-1 becomes an interference signal with respect to a second user equipment UE-2, and vice versa. Accordingly, interference control for inter-user interference reduction is necessary.

Figure 7:
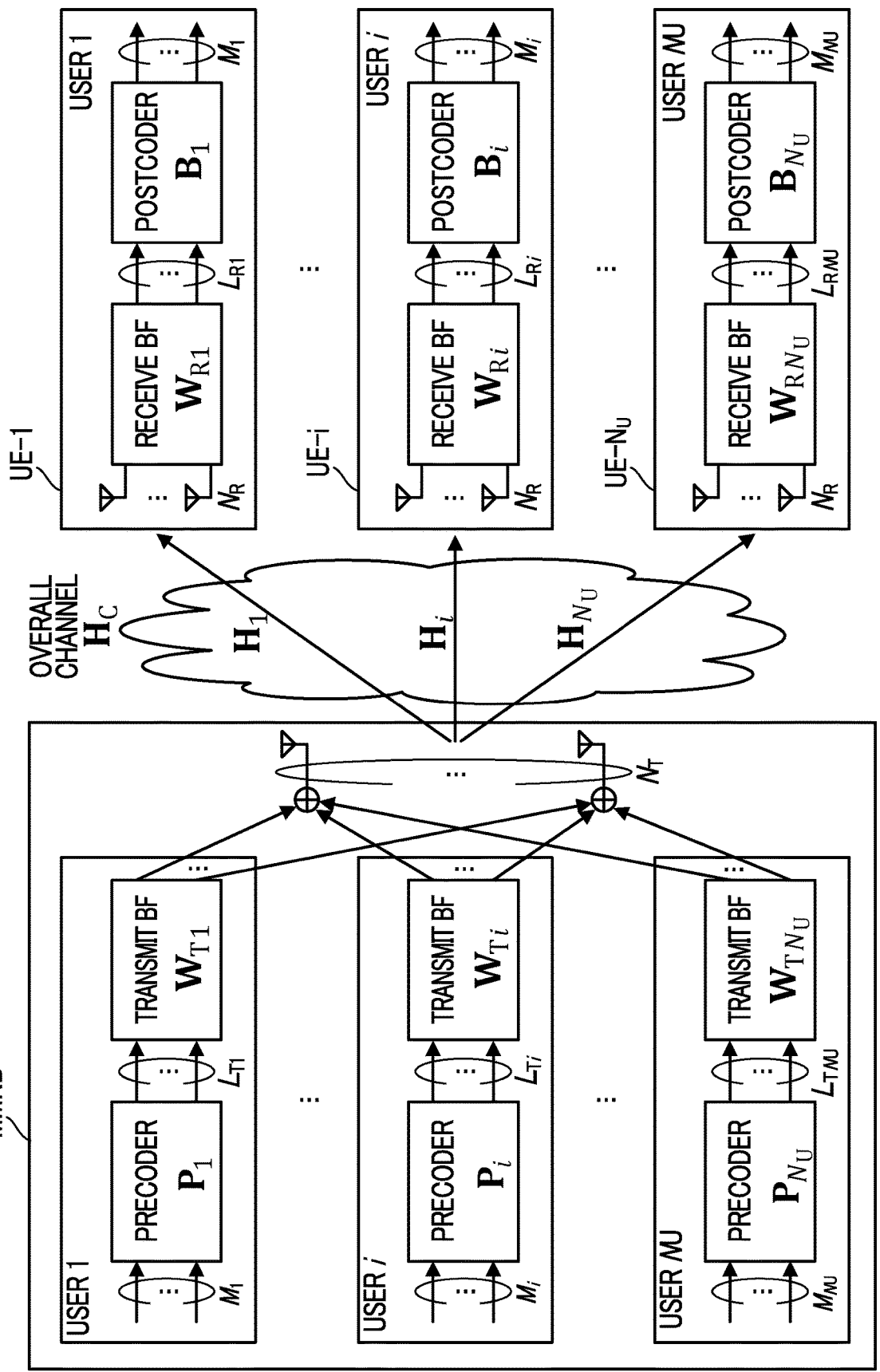
FIG. 7 is a drawing illustrating an example configuration of a transmitter and receivers in massive-MIMO in which fixed beamforming is adopted according to the embodiment.

FIG. 7 is a drawing illustrating one example configuration of a transmitter and receiver in massive-MIMO in which fixed beamforming is adopted. FIG. 7 illustrates a configuration based on MU-MIMO in which there exists a single transmitter and a plurality of receivers. Hereafter, the total number of users (number of receivers) is referred to as $N_U$, and the total number of streams for all users is referred to as M. A certain single user is represented by i ($1 \le i \le N_U$), and the number of streams for an i-th user is represented by $M_i$.

The precoder and transmission beamformer of small base station MMNB, which is a transmitter, respectively carry out precoding and transmit beamforming for signals addressed to each of user equipments UE, which are receivers (first user equipment UE-1, i-th user equipment UE-i, ..., $N_U$-th user equipment UE-$N_U$). Signals for all user equipments UE are added and transmitted from $N_T$ transmission antennas $A_T$. The total number of transmission beams for all users is $L_T$ and the number of transmission beams for the i-th user is $L_{Ti}$ (for example, $L_{Ti}=L_T/N_U$). Each user equipment UE receives signals by way of $N_R$ reception antennas $A_R$, and the reception beamformer and postcoder of each user equipment UE respectively carry out receive beamforming and postcoding.

Mathematically, the precoding process for an i-th user is a process in which an $N_R$-by-1 signal vector s is multiplied by an $L_{Ti}$-by-$N_R$ precoding matrix $P_i$. The above-stated signal vector is represented by the following formula $s_i=[d_i^T \ 0]^T$.

In the above formula, $d_i$ is an $M_i$-by-1 data signal vector corresponding to $M_i$ streams, and 0 is an $(N_R-M_i)$-by-1 zero vector. $(\cdot)^T$ indicates the transposition of a matrix or a vector.

The transmit beamforming process for an i-th user is a process in which signals subjected to precoding are multiplied by an $N_T$-by-$L_{Ti}$ transmit BF weight matrix $W_{Ti}$. Here, if an $N_T$-by-1 transmit BF weight vector corresponding to each of $L_{Ti}$ transmission beams is represented by $w_{Ti,l}$, a transmit BF weight matrix can be represented as $$W_{Ti}=[w_{Ti,1} w_{Ti,2} \cdots w_{Ti,L_{Ti}}].$$

The above precoding process and transmit beamforming process (hereafter sometimes collectively referred to as transmission-side signal processing) are carried out for all users (UE-1, . . . , UE-i, UE-$N_U$). The $N_T$ signals for each user obtained as a result of performing transmission-side signal processing for all users are distributed to $N_T$ adders and added, and transmitted from $N_T$ transmission antennas $A_T$. That is, signal components for all users may be included in signals transmitted from one transmission antenna $A_T$.

Signals transmitted from $N_T$ transmission antennas $A_T$ are received by each user equipment UE. Signals received by an i-th user equipment UE-i are multiplied by an $N_R$-by-$N_T$ channel matrix $H_i$ corresponding to spatial propagation from small base station MMNB to user equipment UE-i. Here, the above-stated channel matrix differs according to the user equipment UE. Thus, an $N_R \cdot N_U$-by-$N_T$ overall channel matrix $$H_C = \begin{bmatrix} H_1 \\ \vdots \\ H_i \\ \vdots \\ H_{N_U} \end{bmatrix}$$

is formed in the overall MU-MIMO system of the present example, where $N_R \cdot N_U$ indicates the overall number of reception antennas $A_R$ of the system.

The receive beamforming process for an i-th user is a process in which received signal vectors (details described below) received by reception antenna $A_R$ are multiplied by an $N_R$-by-$N_R$ receive BF weight matrix $W_{Ri}$. Postcoding process for an i-th user is a process in which signals that have been subjected to receive beamforming are multiplied by an $N_R$-by-$N_R$ postcoding matrix $B_i$. An $N_R$-by-1 signal vector $y_i$ is obtained by a postcoding process. Here, rows 1 to $M_i$ of $y_i$ are data signal vectors corresponding to estimated (regenerated) $M_i$ streams, and the remaining lines ($M_i$+1) to $N_R$ are zero vectors.

1 (3). Configuration of Transmitter and Receiver

Figure 8A:
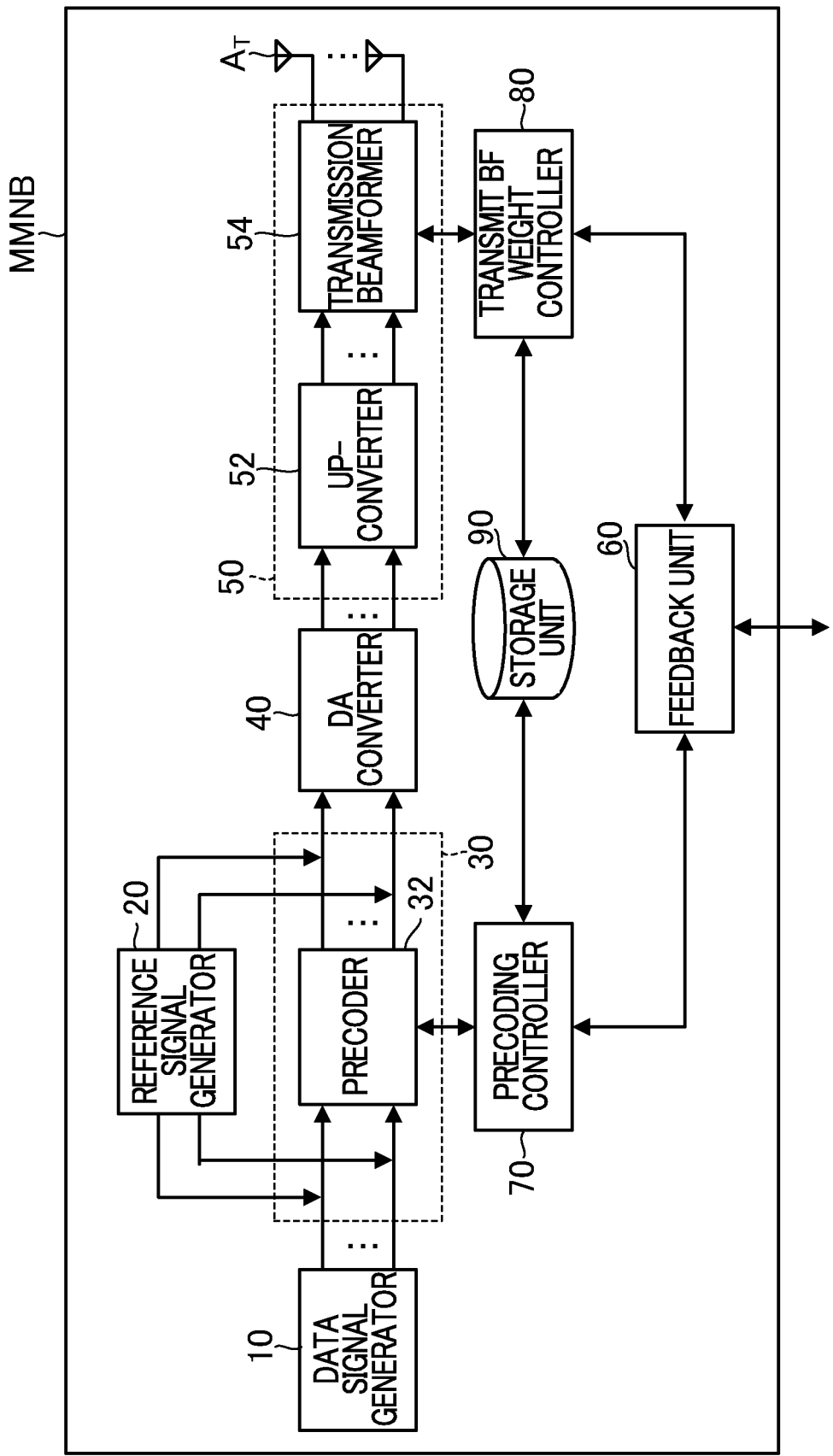
FIG. 8A is a functional block diagram of a small base station in the embodiment.

FIG. 8A is a functional block diagram illustrating the main constituent elements of small base station MMNB (transmitter) of the embodiment. Small base station MMNB comprises a data signal generator 10, a reference signal generator 20, a baseband processor 30, a digital-to-analog converter 40, an RF processor 50, a feedback unit 60, a precoding controller 70, a transmit BF weight controller 80, and a storage unit 90. Baseband processor 30 comprises a precoder 32, and RF processor 50 comprises an up-converter 52 and a transmission beamformer 54. A number $N_T$ of transmission antennas $A_T$ are connected to transmission beamformer 54. The carrier configuration adopted in small base station MMNB of the present embodiment can be adopted as appropriate. For example, a single carrier (SC) may be adopted, or orthogonal frequency division multiplexing (OFDM) may be adopted.

Figure 8B:
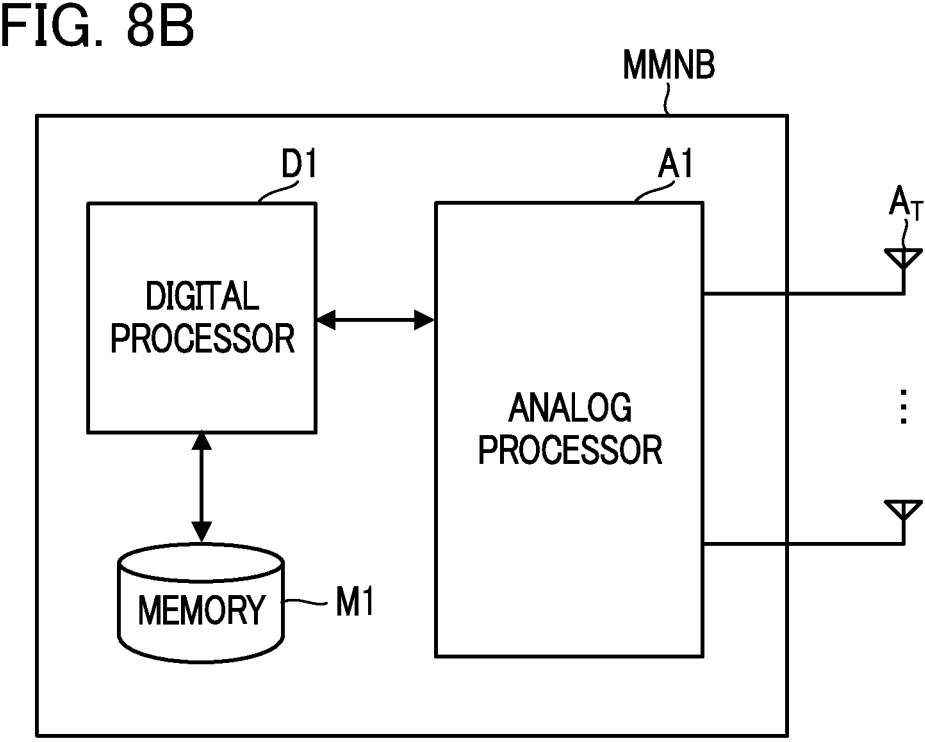
FIG. 8B is a drawing illustrating a circuit configuration of the small base station according to the embodiment.

FIG. 8B illustrates an example of the circuit configuration of small base station MMNB. Small base station MMNB comprises a digital processor D1, a memory M1, an analog processor A1 and transmission antennas $A_T$. Digital processor D1 is an element that carries out various types of digital signal processing, and provides functional elements (functional blocks) such as the aforementioned data signal generator 10, reference signal generator 20, baseband processor 30, feedback unit 60, precoding controller 70, and transmit BF weight controller 80. Digital processor D1 is a CPU (Central Processing Unit), for example, and provides the above-stated functional elements by executing a computer program that is stored in memory M1. Memory M1 may include a RAM and a ROM. Moreover, memory M1 functions as the above-stated storage unit 90. Analog processor A1 is an element that carries out various types of analog signal processing. Analog processor A1 includes the above-stated RF processor 50. Digital-to-analog converter 40 that converts digital signals to analog signals and an analog-to-digital converter that converts analog signals to digital signals are also included in analog processor A1.

Data signal generator 10 illustrated in FIG. 8A generates data signals to be included in signals transmitted to user equipment UE. Data signal processor 10 can generate data signals as a stream of a plurality of sequences. In the present embodiment, data signal generator 10 generates data signals of M streams corresponding to $N_U$ user equipments UE (as described above, the number of streams for an i-th user is $M_i$).

Reference signal generator 20 generates reference signals to be included in signals transmitted to user equipment UE. A reference signal is, for example, a signal used for channel estimation in user equipment UE, reception power measurement in user equipment UE, initial synchronization between user equipment UE and small base station MMNB, identification of small base station MMNB in user equipment UE, and identification of candidate beams in the beam searching. The generated data signals and reference signals are input to baseband processor 30 as baseband signals.

Baseband processor 30 is an element for processing input baseband signals (data signals and reference signals). Baseband processor 30 comprises a precoder 32 that subjects the signal vectors of an i-th user to digital precoding (matrix calculation) by using precoding matrix $P_i$. Precoder 32 carries out the above-stated digital precoding on a total of M streams corresponding to all users (UE-1, ..., UE-$N_U$). That is, precoder 32 operates as $N_U$ precoders.

In ordinary radio transmission, a signal combining a data signal and a reference signal is precoded by precoder 32, and output from baseband processor 30. Meanwhile, concerning estimation of an equivalent channel matrix in the present embodiment, a reference signal that has not been precoded is output from baseband processor 30.

Digital-to-analog converter 40 converts digital signals output from baseband processor 30 into analog signals, and outputs the signals to RF processor 50.

RF processor 50 is an element that processes input analog signals and transmits the signals from transmission antennas $A_T$. RF processor 50 comprises an up-converter 52 that frequency-converts input analog signals into radio frequency (RF) signals, and a transmission beamformer 54 that subjects signals that have been frequency-converted to analog transmit beamforming based on a transmit BF weight matrix $W_{T_l}$. Transmission beamformer 54 carries out the above-stated beamforming for a total of $L_T$ signals corresponding to all transmission beams of all users (UE-1, ..., UE-$N_U$). That is, transmission beamformer 54 operates as $N_U$ transmission beamformers.

High-frequency signals output from transmission beamformer 54 (each transmission beamformer) are added by $N_T$ adders provided to transmission beamformer 54, and transmitted from $N_T$ transmission antennas $A_T$. The above-stated analog beamforming is a process in which variation in phase and amplitude corresponding to multiplication of transmit BF weight matrices is imparted to analog signals by using variable phase shifter PS and amplitude adjuster AA. In other words, in the above-stated analog transmit beamforming, the analog transmit beamforming is carried out on a plurality of analogue signals transmitted from a plurality of transmission antennas $A_T$, and as a result phases and amplitudes of the analog signals are changed in an analog manner. The changes of phases and amplitudes of the analog signals correspond to multiplying the transmit BF weight matrices by a transmission signal vector, the elements of which consist of the plurality of analogue signals.

Feedback unit 60 is an element that performs communication pertaining to control of user equipment UE, and in particular, supplies feedback information from user equipment UE to precoding controller 70 and transmit BF weight controller 80. Precoding controller 70 controls precoding matrices used in precoder 32. Transmit BF weight controller 80 controls BF weight used in transmission beamformer 54.

A BF weight is determined by beam searching. With beam searching: firstly, a plurality of candidate beams that serve as candidates for transmission beams used in radio communication are transmitted from small base station MMNB to each user equipment UE; secondly, reception power is measured by each user equipment UE for each of the plurality of candidate beams; thirdly, feedback information including the measured reception power is transmitted from each user equipment UE to small base station MMNB; and fourthly, BF weight is determined by small base station MMNB based on the feedback information. In addition to reception power information indicating reception power, the feedback information includes determination information indicating whether the reception power is a desired power or an interference power. If the reception power is a desired power, the candidate beams are suited for use in radio communication with user equipment UE that transmitted the feedback information. Meanwhile, if the reception power is an interference power, the candidate beams are not suited for use in radio communication with user equipment UE that transmitted the feedback information, and interference need be controlled. In MU-MIMO, if the number of user equipments UE that communicate with small base station MMNB increases, the processing load in small base station MMNB increases, but the processing load can be reduced by feeding back feedback information including determination information from each user equipment UE to small base station MMNB.

Storage unit 90 stores information pertaining to radio communication control (for example, precoding matrix, and transmit BF weight matrix). Of the units included in small base station MMNB, those that carry out digital processing (for example, data signal generator 10, reference signal generator 20, baseband processor 30, feedback unit 60, precoding controller 70, and transmit BF weight controller 80) are functional blocks that are realized by use of a central processor (CPU), which is not illustrated, executing a computer program stored in storage unit 90 and functioning in accordance with the computer program.

Figure 9A:
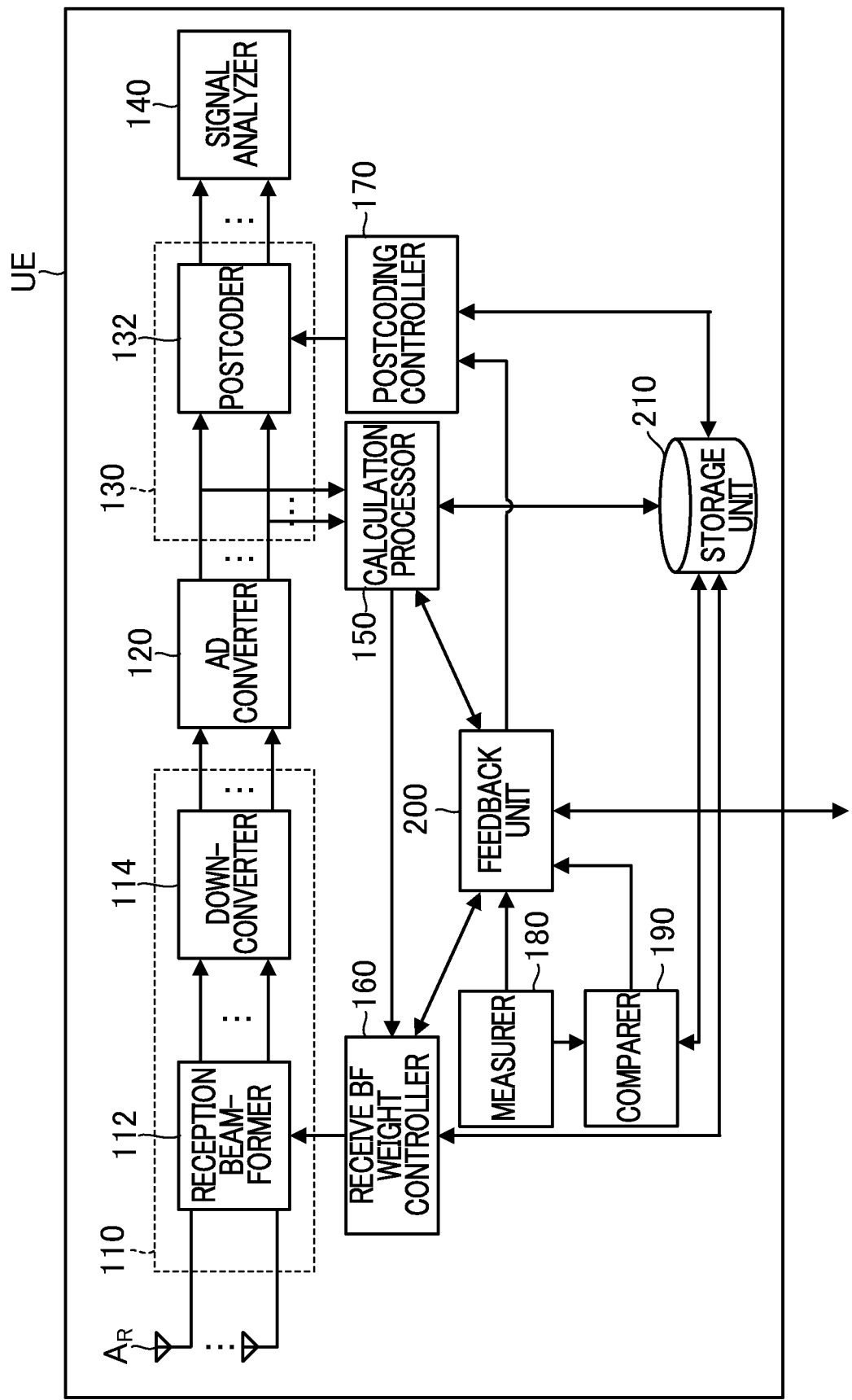
FIG. 9A is a functional block diagram of a user equipment in the embodiment.

FIG. 9A is a functional block diagram illustrating the main constituent elements of user equipment UE (receiver) of the embodiment. User equipment UE comprises an RF processor 110, an analog-to-digital converter 120, a baseband processor 130, a signal analyzer 140, a transmission/ reception characteristic estimator 150, a receive BF weight controller 160, a postcoding controller 170, a measurer 180, a comparer 190, a feedback unit 200, and a storage unit 210. RF processor 110 comprises a reception beamformer 112 and a down-converter 114, and baseband processor 130 comprises a postcoder 132. A number $N_R$ of reception antennas $A_R$ are connected to reception beamformer 112.

Figure 9B:
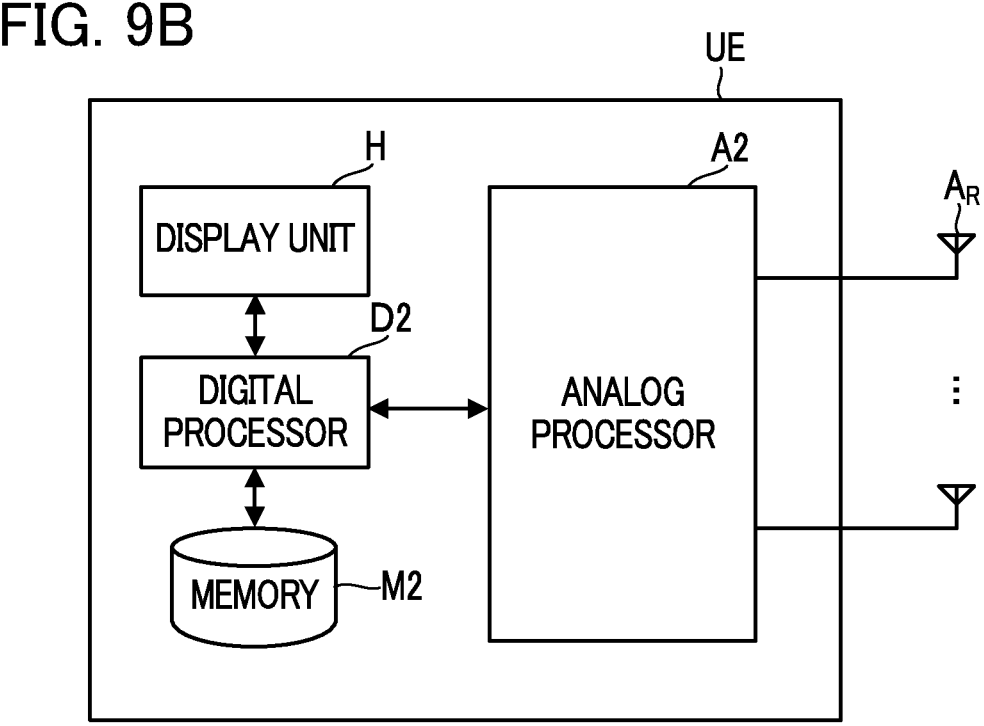
FIG. 9B is a drawing illustrating a circuit configuration of the user equipment according to the embodiment.

FIG. 9B illustrates an example of the circuit configuration of user equipment UE. User equipment UE comprises a digital processor D2, a memory M2, a display unit H, an analog processor A2, and reception antennas $A_R$. Digital processor D2 is an element that carries out various digital signal processing, and provides functional elements (functional blocks) such as the aforementioned baseband processor 130, signal analyzer 140, transmission/reception characteristic estimator 150, receive BF weight controller 160, postcoding controller 170, measurer 180, comparer 190, and feedback unit 200. Digital processor D2 is a CPU, for example, and provides the above-stated functional elements by executing a computer program stored in memory M2. Memory M2 may include a RAM and a ROM. Memory M2 functions as the aforementioned storage unit 210. Analog processor A2 is an element that carries out various types of analog signal processing. Analog processor A2 includes RF processor 50 and the like. Analog-to-digital converter 120 that converts analog signals to digital signals and a digital-to-analog converter that converts digital signals to analog signals are also included in analog processor A2. If the object to be measured by measurer 180 is an RSSI, measurer 180 is included in analog processor A2. Display unit H is configured from a liquid-crystal display device, an organic EL display device or the like, for example. Display unit H may comprise a touch panel, and may accept user input operations in addition to displaying an image.

Following is a continuation of the explanation of FIG. 9A. Radio signals transmitted from small base station MMNB, which is a transmitter, and that have propagated through a space, are received by a number $N_R$ of reception antennas $A_R$ and input to RF processor 110.

RF processor 110 is an element that processes signals received by a plurality of reception antennas $A_R$. RF processor 110 comprises a reception beamformer 112 that subjects received signals to analog receive beamforming based on a receive BF weight matrix $W_{Ri}$, and a down-converter 114 that frequency-converts the input signals into baseband signals and outputs the signals. The above-stated analog receive beamforming is a process in which variation in phase and amplitude corresponding to multiplication of receive BF weight matrices is imparted to analog signals by using variable phase shifter PS and amplitude adjuster AA. In other words, in the above-stated analog receive beamforming, the analog receive beamforming is carried out on a plurality of analogue signals received from a plurality of reception antennas $A_R$, and as a result phases and amplitudes of the analog signals are changed in an analog manner. The changes of phases and amplitudes of the analog signals correspond to multiplying the receive BF weight matrices by a reception signal vector, the elements of which consist of the plurality of analogue signals. If the receive BF weight matrix is a unit matrix, reception beamformer 112 and receive BF weight controller 160 may be omitted.

Analog-to-digital converter 120 converts analog signals output from RF processor 110 into digital signals, and outputs the signals to baseband processor 130.

Baseband processor 130 is an element that processes input baseband signals and restores a number $M_i$ of streams. Baseband processor 130 comprises a postcoder 132 that subjects signals output from analog-to-digital converter 120 to digital postcoding (matrix calculation) by using a postcoding matrix $B_i$. $M_i$ streams are regenerated by the above-stated postcoding. The regenerated $M_i$ streams are input to signal analyzer 140 and then analyzed.

Transmission/reception characteristic estimator 150 carries out estimation of transmission/reception characteristics as described later. Receive BF weight controller 160 controls BF weight used in reception beamformer 112. Postcoding controller 170 controls postcoding matrices used in postcoder 132.

Measurer 180 measures a benchmark pertaining to communication quality, and outputs the measurement results to feedback unit 200. The benchmark can be any type of benchmark as long as communication quality is indicated. For example, RSRP (Reference Signal Received Power) applies (refer to TS36.214, V8.0.0, Section 5.1.1). SINR (Signal-to Interference plus Noise power Ratio), E-UTRA Carrier RSSI (Received Signal Strength Indicator), RSRQ (Reference Signal Received Quality) or the like may be used. Here, RSSI signifies the total of the reception power of all signals such as desired signals from the serving cell, interference signals from other cells, and noise signals due to thermal noise. RSRP signifies the reception power of the reference signal, and SINR is a reception signal power to interference and noise power ratio taking into account surrounding cell interference. Hereafter, explanation is given by using reception power (RSRP and/or RSSI) as an example of the benchmark pertaining to communication quality.

Figure 10:
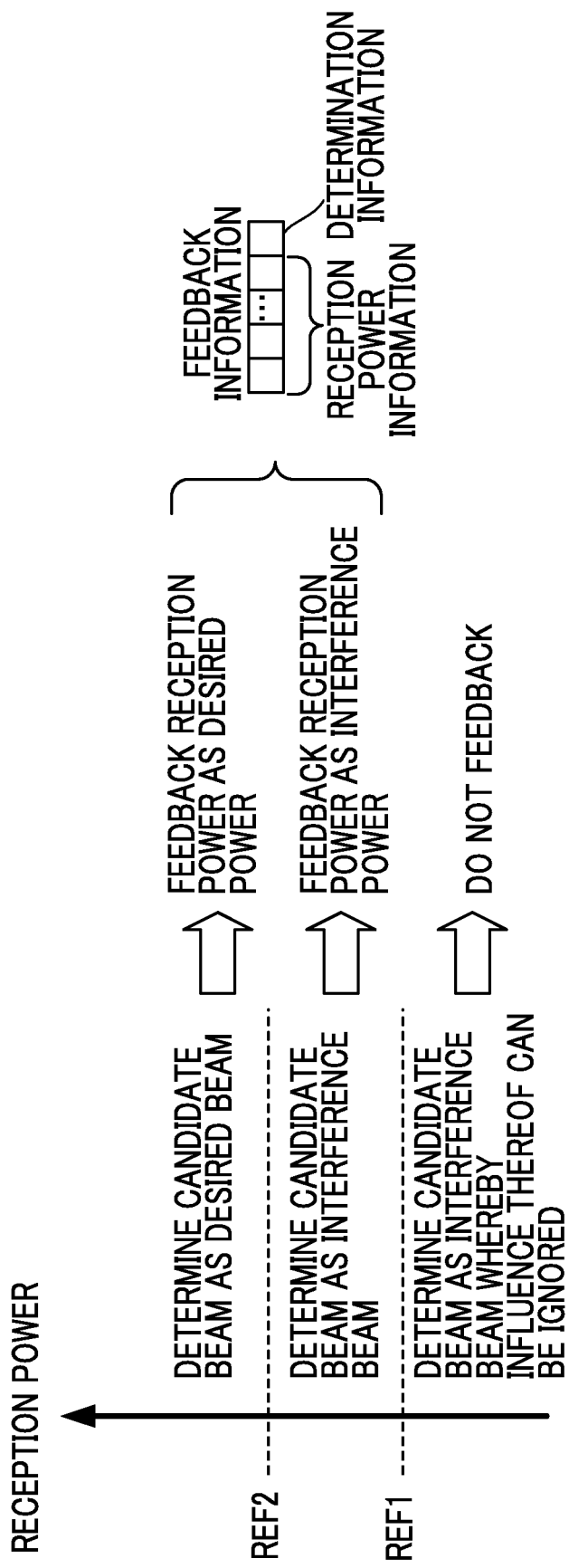
FIG. 10 is a drawing illustrating a relationship between reception power and a first threshold value, and a second threshold value and feedback information, according to the embodiment.

Comparer 190 compares the reception power measured in measurer 180 with a first threshold value REF1 and a second threshold value REF2, and outputs the comparison results to feedback unit 200. FIG. 10 illustrates the relationships between the reception power, and first threshold value REF1 and second threshold value REF2. The reception power related to each of the plurality of candidate beams transmitted from small base station MMNB can be largely divided into a case in which because reception level is high level, reception power should be set to a desired power, a case in which because the reception level is medium level, reception power should be set to an interference power, and a case in which because the reception level is low level, the reception power should be set to an interference power whereby influence of the reception power on communication can be ignored. First threshold value REF1 is set to a value to determine whether or not the reception power is an interference power whereby influence on communication can be ignored. Meanwhile, second threshold value REF2 is set to a value to determine whether or not the reception power is a desired power or an interference power can be determined.

Feedback unit 200 is an element that performs communication pertaining to control with small base station MMNB, and in particular, transmits feedback information from transmission/reception characteristic estimator 150, receive BF weight controller 160 and measurer 180 to small base station MMNB. Feedback unit 200 transmits a reception power to small base station MMNB as feedback information pertaining to an interference power when the reception power is first threshold value REF1 or higher and lower than second threshold value REF2, transmits a reception power to small base station MMNB as feedback information pertaining to a desired power when the reception power is second threshold value REF2 or higher, and does not transmit feedback information to small base station MMNB when a reception power is less than first threshold value REF1, based on the comparison results of comparer 190. Feedback information pertaining to a reception power generated by feedback unit 200 includes determination information indicating whether the reception power is an interference power or a desired power, and reception power information indicating the reception power, as illustrated in FIG. 10. That is, feedback unit 200 transmits a reception power to small base station MM NB as feedback information pertaining to an interference beam when the reception power (benchmark pertaining to communication quality) is first threshold value REF1 or higher and lower than second threshold value REF2, and transmits a reception power to small base station MMNB as feedback information pertaining to a desired beam when the reception power is second threshold value REF2 or higher. In the present example, whether to transmit feedback information is determined and feedback information that should be transmitted is generated, based on reception power, but it is obvious that whether to transmit feedback information can be determined and feedback information that should be transmitted can be generated based on a benchmark pertaining to other communication qualities.

Storage unit 210 stores information pertaining to radio communication control (for example, postcoding matrices, receive BF weight matrices, first threshold value REF 1 and second threshold value REF 2). Of the elements included in user equipment UE, elements that carry out digital processing (for example, baseband processor 130, signal analyzer 140, transmission/reception characteristic estimator 150, receive BF weight controller 160, postcoding controller 170, comparer 190, feedback unit 200, etc.) are functional blocks enabled by use of a Central Processing Unit (CPU), which is not illustrated, that causes a computer program stored in storage unit 210 to be executed, the blocks functioning in accordance with the computer program.

1 (4). Determination of Precoding Matrices 1 (4)-1. Separation of Received Signals by Block Diagonalization If an $N_R$-by-1 received signal vector in an i-th user equipment UE-i is represented by $r_i$, the received signal vectors (received signal vectors of the entire MU-MIMO system) of all user equipments UE (1, . . . , $N_U$) are represented as follows.

$$\begin{bmatrix} r_1 \\ \vdots \\ r_{N_U} \end{bmatrix} = H_C[W_{T1} \ldots W_{TN_U}]\text{diag}[P_1 \ldots P_{N_U}]\begin{bmatrix} s_1 \\ \vdots \\ s_{N_U} \end{bmatrix} + \begin{bmatrix} z_1 \\ \vdots \\ z_{N_U} \end{bmatrix}$$

$$= \begin{bmatrix} H_1 W_{T1} & \ldots & H_1 W_{TN_U} \\ \vdots & \ddots & \vdots \\ H_{N_U} W_{T1} & \ldots & H_{N_U} W_{TN_U} \end{bmatrix} \text{diag}[P_1 \ldots P_{N_U}]\begin{bmatrix} s_1 \\ \vdots \\ s_{N_U} \end{bmatrix} + \begin{bmatrix} z_1 \\ \vdots \\ z_{N_U} \end{bmatrix}$$

$$= \begin{bmatrix} H_1 W_{T1} P_1 & \ldots & H_1 W_{TN_U} P_{N_U} \\ \vdots & \ddots & \vdots \\ H_{N_U} W_{T1} P_1 & \ldots & H_{N_U} W_{TN_U} P_{N_U} \end{bmatrix} \begin{bmatrix} s_1 \\ \vdots \\ s_{N_U} \end{bmatrix} + \begin{bmatrix} z_1 \\ \vdots \\ z_{N_U} \end{bmatrix} \quad (1)$$

The non-diagonal components of the matrix $$\begin{bmatrix} H_1 W_{T1} P_1 & \ldots & H_1 W_{TN_U} P_{N_U} \\ \vdots & \ddots & \vdots \\ H_{N_U} W_{T1} P_1 & \ldots & H_{N_U} W_{TN_U} P_{N_U} \end{bmatrix} \quad (2)$$

in the above formula (1), that is, $H_k W_{Ti} P_i (k \neq i)$ correspond to interference components imparted by signals to an i-th user with respect to signals to a k-th user that is not the i-th user. Therefore, precoding controller 70 sets each precoding matrix $P_i$ which satisfies $H_k W_{Ti} P_i = 0$ (k≠i), and as a result, all non-diagonal components (interference components) of the above-stated matrix (2) can be set to 0 (that is, matrix (2) can be subjected to block diagonalization).

Formula (1) after matrix (2) has been subjected to block diagonalization is represented by the following formula.

$$\begin{bmatrix} r_1 \\ \vdots \\ r_{N_U} \end{bmatrix} = \begin{bmatrix} H_1 W_{T1} P_1 & & 0 \\ & \ddots & \\ 0 & & H_{N_U} W_{TN_U} P_{N_U} \end{bmatrix} \begin{bmatrix} s_1 \\ \vdots \\ s_{N_U} \end{bmatrix} + \begin{bmatrix} z_1 \\ \vdots \\ z_{N_U} \end{bmatrix} \quad (3)$$

Based on the above-stated formula (3), received signal vectors of an i-th user are represented by $r_i = H_i W_{Ti} P_i s_i + z_i$. That is, by precoding controller 70 setting each precoding matrix so as to subject matrix (2) to block diagonalization, for the i-th user equipment UE-i, a transmit BF weight matrix $W_{Ti}$ corresponding to the user equipment UE-i can be selected, and impact (channel response) of channel matrices $H_k$ (k=1, . . . , i−1, i+1, . . . $N_U$) other than the channel matrix $H_i$ corresponding to user equipment UE-i can be eliminated (that is, a plurality of users compatible with MU-MIMO can be subjected to orthogonalization). As a result, received signal vectors that do not include interference signal components can be obtained for the i-th user.

1 (4)-2. Precoding Matrix Calculation for Realizing Block Diagonalization $N_U$ precoding matrices $P_i$ (i=1 . . . $N_U$) for subjecting the matrix (2)

$$\begin{bmatrix} H_1 W_{T1} P_1 & \ldots & H_1 W_{TN_U} P_{N_U} \\ \vdots & \ddots & \vdots \\ H_{N_U} W_{T1} P_1 & \ldots & H_{N_U} W_{TN_U} P_{N_U} \end{bmatrix}$$

to block diagonalization are calculated by precoding controller 70. Hereafter, $H_k W_{Ti} = H_{k,i}$ represents transmit BF weight matrices and channel matrices as one entity. Moreover, matrix $H_{k,i}$ is hereafter sometimes referred to as "equivalent channel matrix".

Of the equivalent channel matrices $H_{1,i}, \ldots, H_{i,i}, \ldots, H_{N_U,i}$ including transmit BF weight matrices corresponding to the i-th user, a set of $N_R \cdot (N_U-1)$-by-$L_{Ti}$ equivalent channel matrices (excluded channel matrices), excluding equivalent channel matrix $H_{i,i}$ that includes a channel matrix corresponding to the i-th user are defined as follows.

$$\tilde{H}_i' = [(H_{1,i})^T, \ldots, (H_{i-1,i})^T (H_{i+1,i})^T, \ldots, (H_{N_U,i})^T]^T$$

The above-stated excluded channel matrices can be represented as a set including a plurality of equivalent channel matrices obtained by multiplying a transmit BF weight matrix $W_{Ti}$ corresponding to the i-th user by each of the channel matrices $H_1, \ldots, H_{i-1}, H_{i+1}, \ldots, H_{N_U}$ corresponding to users other than the i-th user.

The following formula (4) is obtained by subjecting the above-stated excluded channel matrices to single value decomposition.

$$\tilde{H}_1' = \tilde{U}_i' \tilde{\Sigma}_i' (\tilde{V}_i')^H \quad (4)$$

$$= \tilde{U}_i' \tilde{\Sigma}_i' [\tilde{V}_i'^{(1)} \ \tilde{V}_i'^{(2)}]^H$$

Here, $(\cdot)^H$ indicates a conjugate transpose matrix.

In the above formula (4), left singular matrix $\tilde{U}_i'$ is an $N_R \cdot (N_U-1)$-by-$N_R \cdot (N_U-1)$ unitary matrix. Right singular matrix $\tilde{V}_i'$ is an $L_{Ti}$-by-$L_{Ti}$ unitary matrix. Singular value matrix $\tilde{\Sigma}_i'$ is an $N_R \cdot (N_U-1)$-by-$L_{Ti}$ matrix having the singular value of $\tilde{H}_i'(\tilde{H}_i')^H$ as a diagonal matrix component and zero as a non-diagonal matrix component. Moreover, $\tilde{V}_i'^{(1)}$ is an $L_{Ti}$-by-$N_R \cdot (N_U-1)$ matrix, and $\tilde{V}_i'^{(2)}$ is an $L_{Ti}$-by-$(L_{Ti}-N_R \cdot (N_U-1))$ matrix.)

$\tilde{V}_i'^{(2)}$ is an eigenvector (first eigenvector) corresponding to a noise subspace on the transmitter side of excluded channel matrix $\tilde{H}_i'$ and is used for block diagonalization in the present embodiment.

Here, first eigenvector $\tilde{V}_i'^{(2)}$ satisfies the following formula (5).

$$H_{k,i} \tilde{V}_i'^{(2)} = H_k W_{Ti} \tilde{V}_i'^{(2)} \begin{cases} = 0 (i \neq k) \\ \neq 0 (i = k) \end{cases} \quad (5)$$

Next, the below formula (6) is obtained by subjecting the product of the equivalent channel matrix and the first eigenvector $H_{k,i} \tilde{V}_i'^{(2)}$ to single value decomposition.

$$H_{k,i} \tilde{V}_i'^{(2)} = U_i' \Sigma_i' (V_i')^T \quad (6)$$

$$= U_i' \Sigma_i' [V_i'^{(1)} \ V_i'^{(2)}]^T$$

In the above formula (5), left singular matrix $U_i'$ is an $N_R$-by-$N_R$ unitary matrix. Right singular matrix $V_i'$ is an $(L_{Ti}-N_R)$-by-$(L_{Ti}-N_R)$ unitary matrix. Singular value matrix $\Sigma_i'$ is an $N_R$-by-$(L_{Ti}-N_R)$ matrix having the singular value of $H_{k,i} \tilde{V}_i'^{(2)} (H_{k,i} \tilde{V}_i'^{(2)})^H$ as a diagonal matrix component and zero as a non-diagonal matrix component. Moreover, $V_i'^{(1)}$ is an $(L_{Ti}-N_R)$-by-$N_R$ matrix, and $V_i'^{(2)}$ is an $(L_{Ti}-N_R)$-by-$(L_{Ti}-N_R-N_R)$ matrix.

$V_i'^{(1)}$ is an eigenvector (second eigenvector) corresponding to a signal subspace on the transmitter side of $H_{k,i} \tilde{V}_i'^{(2)}$ and is used for block diagonalization in the present embodiment.

Based on the eigenvectors (first eigenvector and second eigenvector) obtained as such, a precoding matrix for the i-th user is calculated as indicated in the following formula (7).

$$P_i = \tilde{V}_i'^{(2)} V_i'^{(1)} \quad (7)$$

Moreover, a postcoding matrix for the i-th user is calculated as indicated in the following formula (8).

$$B_i = (U_i')^H \quad (8)$$

When the above formula (7) is substituted in the non-diagonal component $H_k W_{Ti} P_i$ ($k \neq i$) of matrix (2), $H_k W_{Ti} \tilde{V}_i'^{(2)} V_i'^{(1)}$ ($k \neq i$) is obtained. Based on the relationship in formula (5), the above non-diagonal component becomes 0.

As such, by precoding controller 70 setting a precoding matrix for each user as indicated in formula (7), matrix (2) becomes block diagonalized, and formula (3) holds (that is, a plurality of users compatible with MU-MIMO are mutually orthogonalized).

If the postcoding matrix in formula (8) is used, formula (3) can be further modified as follows:

$$\begin{bmatrix} B_1 r_1 \\ \vdots \\ B_{N_U} r_{N_U} \end{bmatrix} = \begin{bmatrix} B_1 H_1 W_{T1} P_1 & & 0 \\ & \ddots & \\ 0 & & B_{N_U} H_{N_U} W_{TN_U} P_{N_U} \end{bmatrix} \begin{bmatrix} s_1 \\ \vdots \\ s_{N_U} \end{bmatrix} + \begin{bmatrix} B_1 z_1 \\ \vdots \\ B_{N_U} z_{N_U} \end{bmatrix}$$

$$= \begin{bmatrix} \Sigma_1' & & 0 \\ & \ddots & \\ 0 & & \Sigma_{N_U}' \end{bmatrix} \begin{bmatrix} s_1 \\ \vdots \\ s_{N_U} \end{bmatrix} + \begin{bmatrix} B_1 z_1 \\ \vdots \\ B_{N_U} z_{N_U} \end{bmatrix}.$$

For the above-stated block diagonalization to hold, the number $L_{Ti}$ of transmission beams used by each user (i-th user) must be at least the overall number $N_R \cdot N_U$ of reception antennas $A_R$ ($L_{Ti} \geq N_R \cdot N_U$). Moreover, as described above, in a case in which the number of transmission beams of the i-th user is represented by $L_{Ti} = L_T/N_U$, the number $L_T$ of transmission beams of the entire system must be at least $N_R \cdot N_U^2$ ($L_T \geq N_R \cdot N_U^2$).

1 (4)-3. Determination of Weight Matrices

As such, by $N_U$ precoding matrices $P_i$ ($i=1 \ldots N_U$) being determined by precoding controller 70, overall channel matrix $H_c$ in the MU-MIMO system is block diagonalized. In other words, as long as precoding matrix $P_i$ is determined as described above, transmit BF weight matrix $W_{Ti}$s and receive BF weight matrix $W_{Ri}$ can be arbitrarily determined.

In the present embodiment, transmit BF weight controller 80 may determine transmit BF weight matrix $W_{Ti}$ of the i-th user, the elements of which are set to elements to maximize reception power for the i-th user, based on feedback information, for example, determine the transmit BF weight matrix to maximize the signal-to-interference ratio for the i-th user, or determine the transmit BF weight matrix to maximize the overall channel capacity of the system. As described above, feedback information includes determination information indicating whether a reception power is a desired power or an interference power, thereby eliminating the necessity for transmit BF weight controller 80 to determine whether the reception power is a desired power or an interference power. Consequently, it is possible to reduce the processing load of transmit BF weight controller 80.

Transmit BF weight controller 80 may generate transmit BF weight matrix $W_{Ti}$ of the i-th user using a steering vector indicating changes of phase and amplitude, which are caused by processes that variable phase shifter PS and amplitude adjuster AA have carried out. Transmit BF weight controller 80 also may generate the transmit BF weight matrix based on DFT (Discrete Fourier Transform) precoding, or generate transmission beams of which one is orthogonalized to another between a plurality of users using a Butler matrix.

In the present embodiment, receive BF weight matrix $W_{Ri}$ of the i-th user is determined as an $N_R$-by-$N_R$ unit matrix. That is, a configuration in which BF weight is not multiplied is adopted on the reception side.

1 (4)-3-1. Specific Example of Determination of Transmit BF Weight Matrices

Following is a specific exemplification of a configuration in which transmit BF weight matrices are determined for an i-th user by using steering vectors. As described above, a transmit BF weight matrix is represented by $$W_{Ti} = [w_{Ti,1} w_{Ti,2} \ldots w_{Ti,L_{Ti}}].$$

Candidates for transmit BF weight vector $w_{Ti,l}$ corresponding to an l-th transmission beam are represented by the following steering vector $$w(\Phi, \theta) = \frac{1}{\sqrt{N_T}} \left[ \exp\{-jW_{0,0}(\Phi, \theta)\} \ldots \exp\{-jW_{N_{Tx}-1,0}(\Phi, \theta)\}, \ldots \exp\{-jW_{0,N_{Tz}-1}(\Phi, \theta)\} \ldots \exp\{-jW_{N_{Tx}-1,N_{Tz}-1}(\Phi, \theta)\} \right]^T$$

having a $\Phi$ (horizontal angle) and a $\theta$ (vertical angle), which are variables that differ depending on the candidate. Here, $W_{n_x,n_z}(\Phi, \theta)$ in the formula is a phase rotation amount in the horizontal $n_x$-th ($n_x=0$ to $N_{Tx}-1$) and vertical $n_z$-th ($n_z=0$ to $N_{Tz}-1$) antenna elements of a uniform planar array in which a plurality of transmission antennas $A_T$ are arranged, and is represented by $$W_{n_x,n_z}(\Phi, \theta) = \frac{2\pi}{\lambda}(n_x \Delta x \cos \Phi \sin \theta + n_z \Delta z \cos \theta).$$

$\lambda$ indicates the wavelength of a carrier wave.

Figure 11:
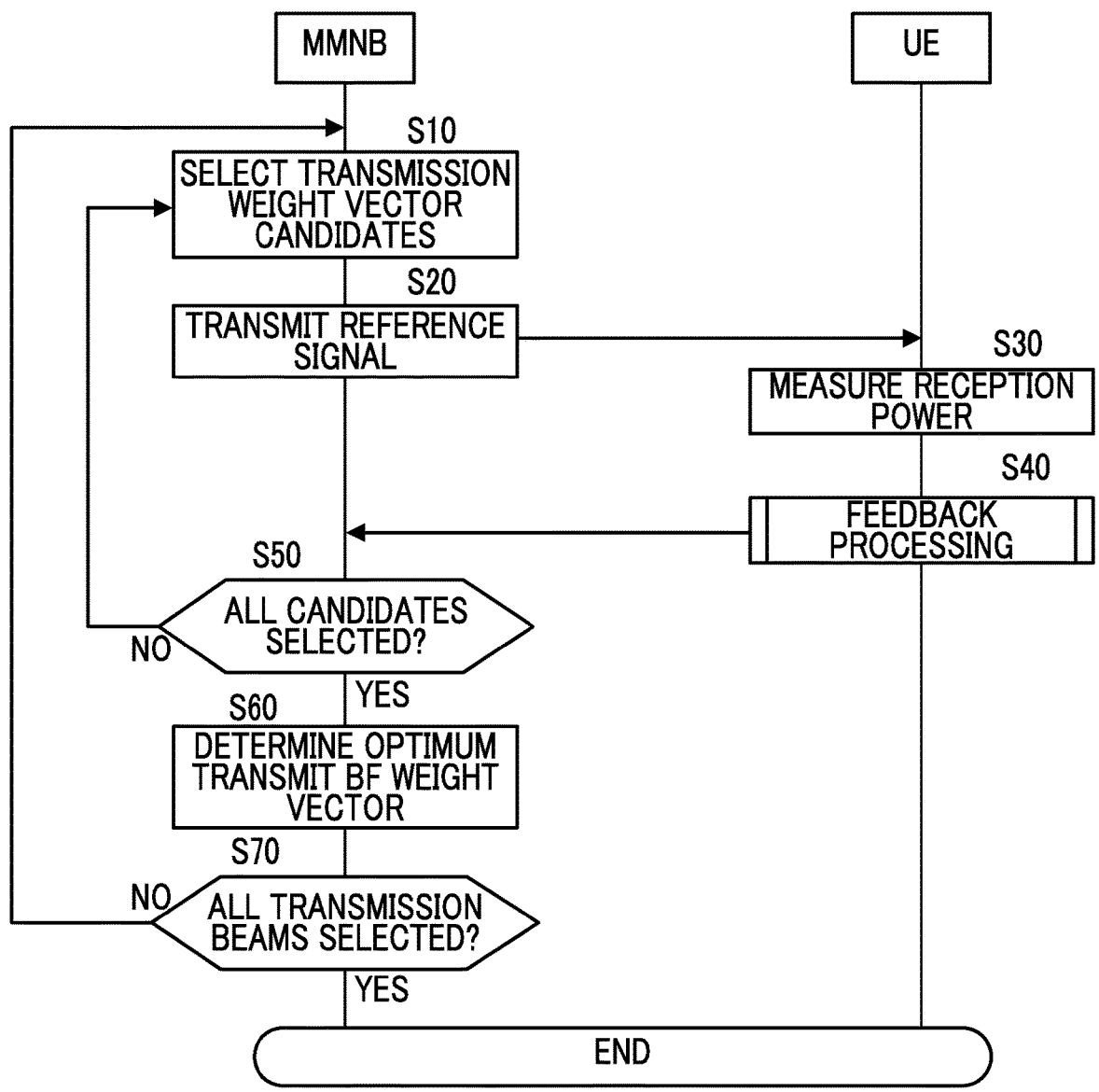
FIG. 11 is an operational flow of a determination process of a transmit BF weight matrix in the embodiment.

FIG. 11 shows the operational flow of the determination process for a transmit BF weight matrix. Small base station MMNB selects one transmit BF weight vector $w_{Ti,l}$ candidate (that is, a combination of $\Phi$ and $\theta$ which are steering vector variables) corresponding to the l-th transmission beam (S10), and transmits reference signals of $L_{Ti}$ mutually orthogonal streams (S20). As a result of this process, one candidate beam is transmitted from small base station MMNB to user equipment UE. User equipment UE, which has received the candidate beam, measures the reception power of the transmitted reference signals by using measurer 180 (S30).

Figure 12:
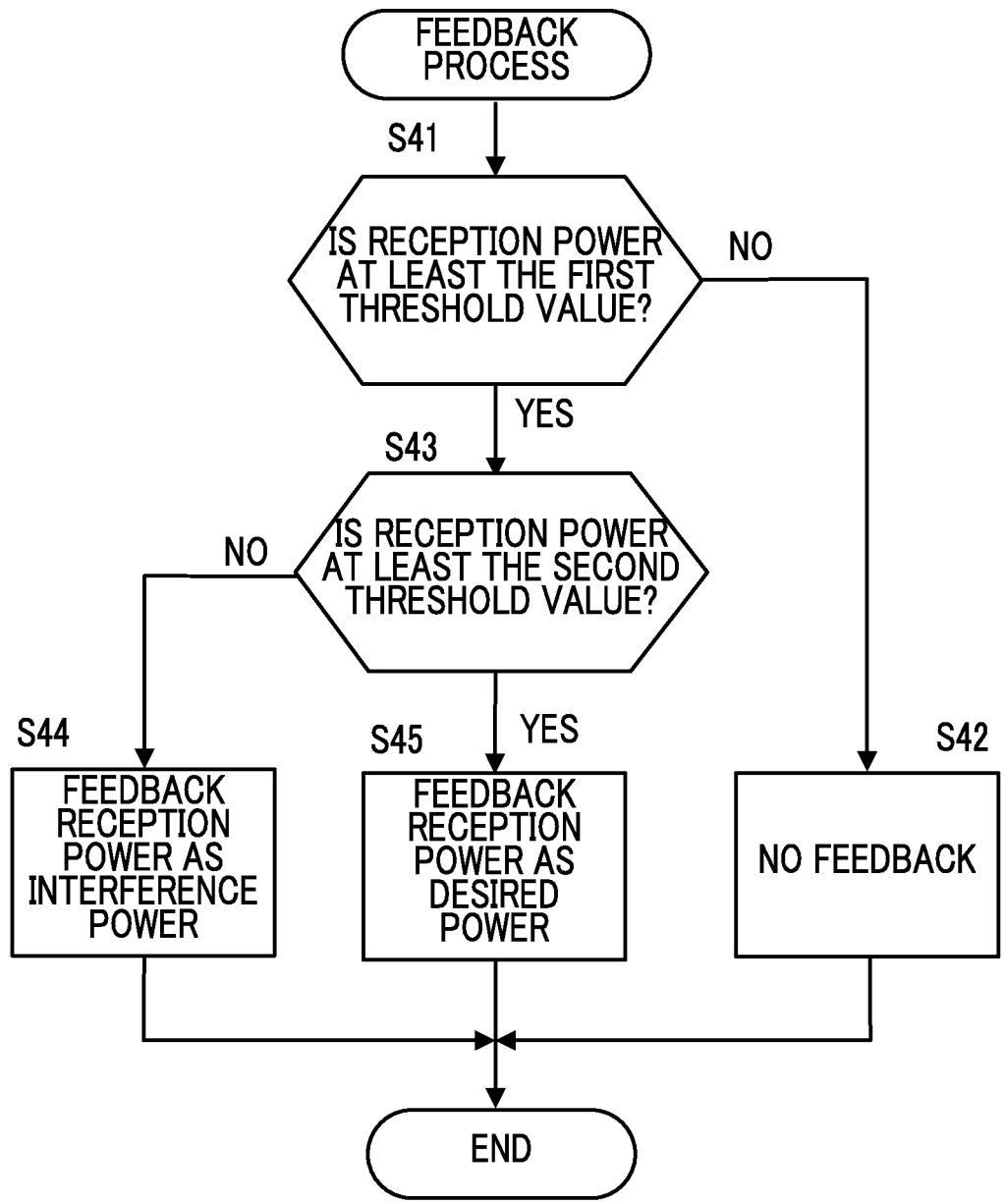
FIG. 12 is an operational flow of a feedback process of the embodiment.

Subsequently, user equipment UE carries out a feedback process (S40: YES). FIG. 12 is a flow chart illustrating the details of the feedback process. Firstly, comparer 190 determines whether or not the reception power is first threshold value REF1 or higher (S41). If the reception power is less than first threshold value REF1, a determination condition is denied (S41: NO), and feedback unit 200 completes processing without feeding back the feedback information to small base station MMNB (S42).

Meanwhile, if the reception power is first threshold value REF1 or higher, comparer 190 determines whether or not the reception power is second threshold value REF2 or higher (S42). If the reception power is less than second threshold value REF2, a determination condition is denied (S42: NO), and feedback unit 200 feeds back the reception power to small base station MMNB as an interference power (S44). If the reception power is second threshold value REF2 or higher, a determination condition is affirmed (S43: YES), and feedback unit 200 feeds back the reception power to small base station MMNB as a desired power (S45).

Figure 13:
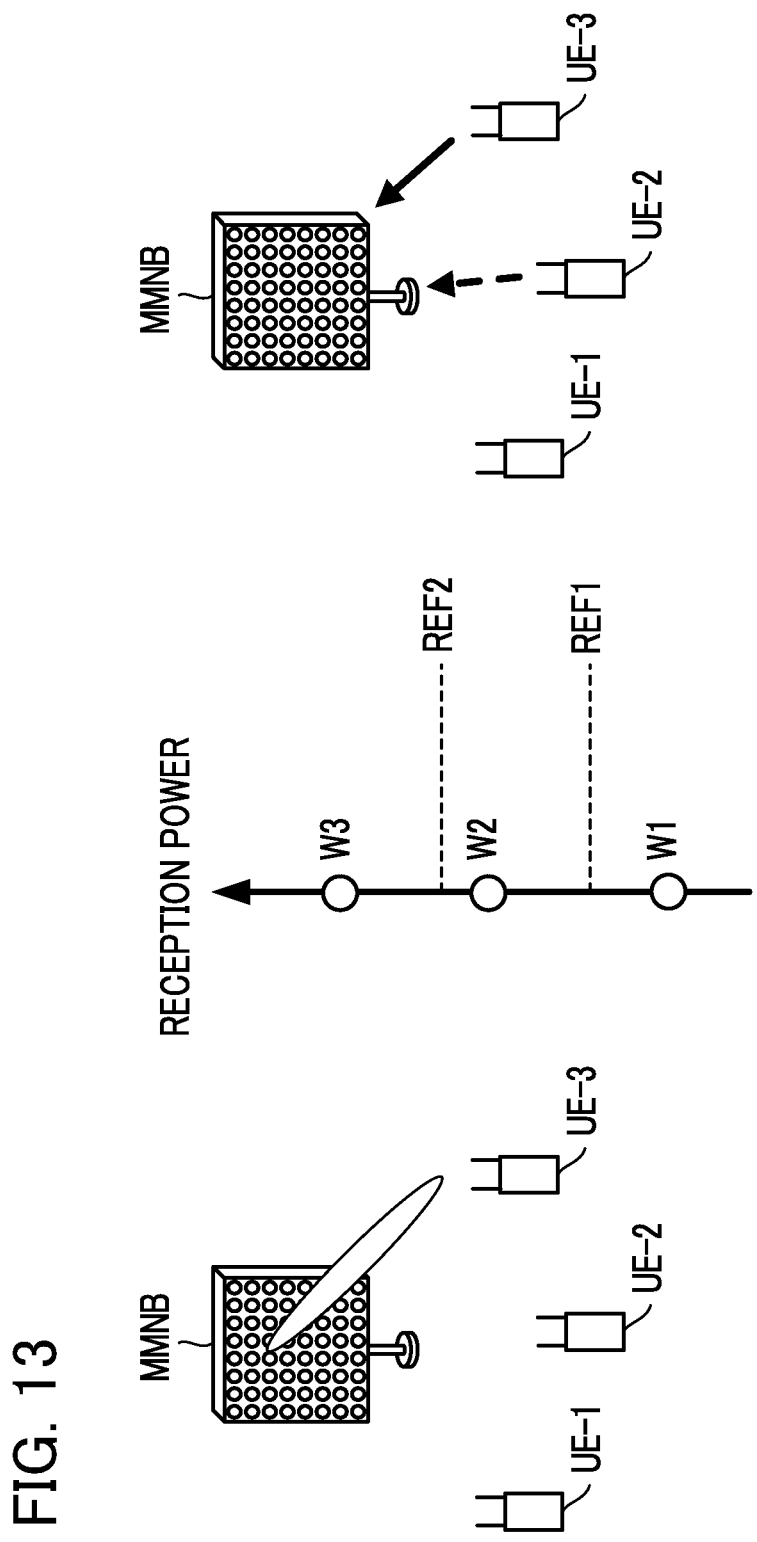
FIG. 13 is a drawing explaining a specific example of feedback of reception power when a candidate beam has been transmitted, according to the embodiment.

FIG. 13 is an explanatory diagram illustrating a specific example of the feedback of reception power when a certain candidate beam has been transmitted. In this example, user equipment UE-1, UE-2 and UE-3 are included in the MM cell Cmm of small base station MMNB. If a candidate beam of a predetermined direction is transmitted from small base station MMNB, a reception power is measured in each of user equipments UE-1 to UE-3. Here, the reception power measured in user equipment UE-1 is W1, the reception power measured in user equipment UE-2 is W2, and the reception power measured in user equipment UE-3 is W3. In this example, the relationship W1<REF1<W2<REF2<W3 applies.

In this case, since reception power W1 measured in user equipment UE-1 is less than first threshold value REF1, feedback information is not fed back from user equipment UE-1 to small base station MMNB. Since reception power W2 measured in user equipment UE-2 is first threshold value REF1 or higher and less than second threshold value REF2, reception power W2 is fed back from user equipment UE-2 to small base station MMNB as an interference power. Moreover, since reception power W3 measured in user equipment UE-3 is second threshold value REF2 or higher, reception power W3 is fed back from user equipment UE-3 to small base station MMNB as a desired power.

As described above, first threshold value REF1 is set to a value to determine whether or not the reception power is an interference power whereby an influence on communication can be ignored. Accordingly, even if feedback information is not transmitted to small base station MMNB when the reception power is less than first threshold value REF1, a problem does not occur when BF weight is determined. With MU-MIMO, a plurality of user equipments UE need to feed back to small base station MMNB, but the amount of feedback information can be reduced by not transmitting feedback information.

Figure 14:
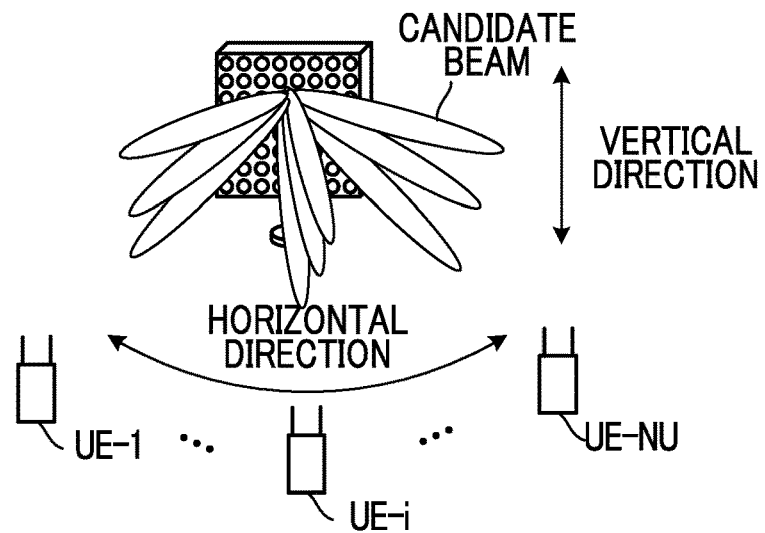
FIG. 14 is a drawing explaining transmission of a candidate beam according to the embodiment.

Following is a continuation of the explanation of FIG. 11. Small base station MMNB repeats the above-stated steps until all steering vector candidates have been selected (S50: NO). Transmit BF weight vector candidates (that is, combinations for $\Phi$ and $\theta$) are preferably selected while performing shifting using predetermined difference values $\Delta\Phi$ and $\Delta\theta$ as units. As a result of this step, as illustrated in FIG. 14, a plurality of candidate beams shifted in the horizontal direction and vertical direction are transmitted to user equipments UE-1 to UE-$N_U$.

Once all steering vector candidates have been selected (S50: YES), small base station MMNB selects, in accordance with a certain standard, an optimum transmit BF weight vector $w_{Ti,l}$ candidate (that is, a combination of $\Phi$ and $\theta$) corresponding to the l-th transmission beam based on the reception power of the reference signal, that is fed back and transmitted from user equipment UE, corresponding to each of the transmit BF weight vector candidates (S60). For example, the selection may employ a standard such as maximizing the overall system capacity, increasing a predetermined user equipment UE throughput, or the like.

By the above-stated operation being repeated $L_{Ti}$ times, which is the number of transmission beams of the i-th user (S70: NO), the transmit BF weight matrix $W_{Ti}$ of the i-th user is determined.

Figure 15:
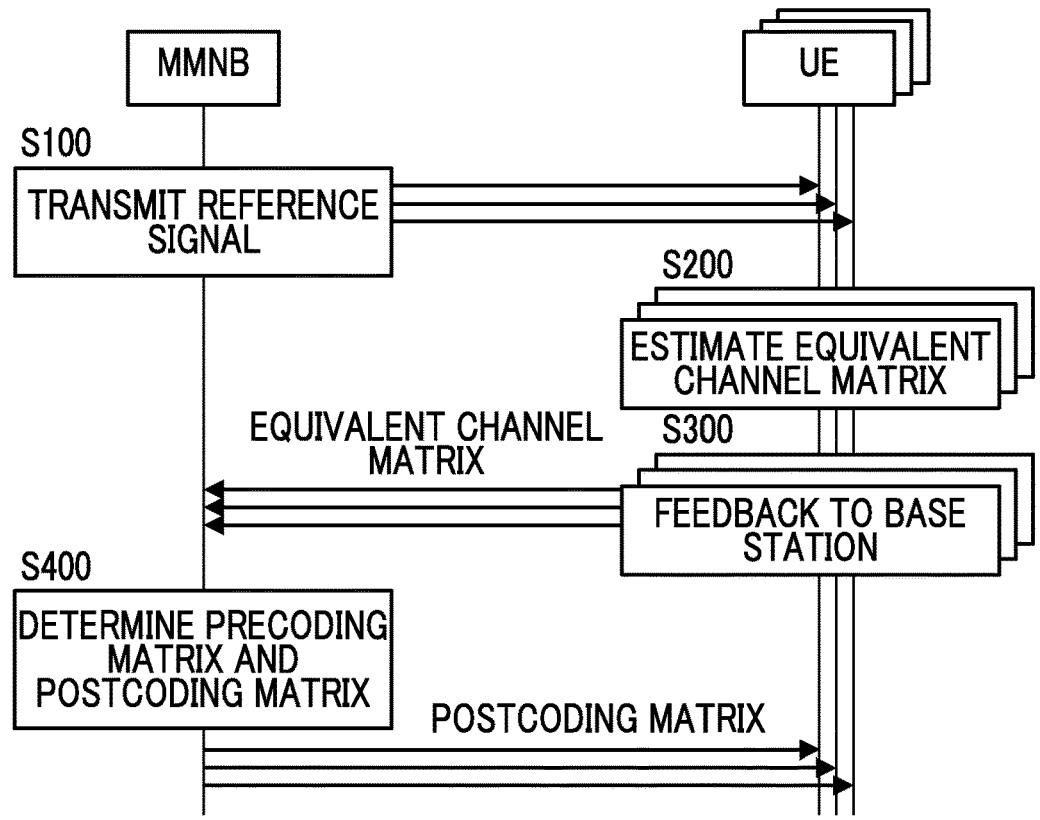
FIG. 15 is a part of an operational flow indicating the determination process of the precoding matrix and postcoding matrix in the embodiment.

1 (5). Operational Flow of the Determination Process of Precoding Matrices and Postcoding Matrices FIG. 15 shows the operational flow indicating the determination process of precoding matrices and postcoding matrices in the present embodiment. Here, in the following operational flow, the transmit BF weight matrix $W_{Ti}$ (i=1 ... $N_U$) and receive BF weight matrix $W_{Ri}$ (i=1 ... $N_U$) of each user are considered to be determined in advance by using the aforementioned method (method disclosed in the "1 (3)-3. Determination of weight matrices" section), for example. As described above, the receive BF weight matrix $W_{Ri}$ in the present embodiment is a unit matrix.

Transmit BF weight controller 80 of small base station MMNB makes transmission beamformer 54 carry out analog transmit beamforming to subject reference signals RS and makes transmission beamformer 54 transmit the reference signals from $N_T$ transmission antennas $A_T$ by using the transmit BF weight matrices $W_{T1}, \ldots, W_{TN_U}$ for all users (S100).

Reference signals RS transmitted from transmission antennas $A_T$ become reference signals RS multiplied by respective channel matrices $H_1, \ldots, H_{N_U}$ corresponding to each user equipment UE by propagation of space (propagation path) towards each user equipment (UE-1, ..., UE-$N_U$) before reaching each user equipment UE (UE-1, ..., UE-$N_U$).

Receive BF weight controller 160 of an i-th user equipment UE-i makes reception beamformer 112 carry out analog receive beamforming to subject reference signals RS received by reception antennas $A_R$ using receive BF weight matrix $W_{Ri}$ which is a unit matrix. That is, reception weight is not multiplied.

Reference signals RS received by reception beamformer 112 are input to transmission/reception characteristic estimator 150 via down-converter 114 and analog-to-digital converter 120. Transmission/reception characteristic estimator 150 estimates an equivalent channel matrix $H_{i,1}, \ldots, H_{i,i}, \ldots, H_{i,N_U}$ ($=H_i W_{Ti} \ldots, H_i W_{Ti}, \ldots, H_i W_{TN_U}$) using the input reference signals RS (S200). The above channel matrix is a characteristic matrix indicating signal change caused by transmit beamforming and spatial propagation. The above-stated equalization channel matrix estimation is carried out in the same way as general channel estimation. For example, channel matrix estimation using the least squares method can be adopted. The estimated equivalent channel matrix is fed back from i-th user equipment UE-i via feedback unit 200 (S300), and received by small base station MMNB. Here, the size of the channel matrix of the i-th user is $N_T \times N_R$. In contrast, since the size of the equivalent channel matrix of the i-th user is $L_{Ti} \times N_R$, thus the feedback information amount can be reduced as opposed to feeding back the channel matrix. Overhead accompanying transmission of feedback information is reduced, thereby making possible improvement of data transmission throughput.

As a result of all user equipments UE (UE-1, ..., UE-$N_U$) carrying out the above-stated steps S200 and S300, small base station MMNB acquires all combinations $$\begin{bmatrix} H_{1,1} & \cdots & H_{1,N_U} \\ \vdots & \ddots & \vdots \\ H_{N_U,1} & \cdots & H_{N_U,N_U} \end{bmatrix} = \begin{bmatrix} H_1 W_{T1} & \cdots & H_1 W_{TN_U} \\ \vdots & \ddots & \vdots \\ H_{N_U} W_{T1} & \cdots & H_{N_U} W_{TN_U} \end{bmatrix}$$

of equivalent channel matrices.

Precoding controller 70 of small base station MMNB generates excluded channel matrices $\tilde{H}_1', \ldots, \tilde{H}_i', \ldots, \tilde{H}_{N_U}'$ for all users by using all of the acquired combinations of equivalent channel matrices, and determines $N_U$ precoding matrices $P_i$ (i=1 ... $N_U$) and postcoding matrices $B_i$ (i=1 ... $N_U$) according to the aforementioned method (method explained in the "1 (3)-2. Calculation of precoding matrices for achieving block diagonalization" section) (S400).

In the present example, determination of precoding matrices and postcoding matrices is carried out in small base station MMNB (precoding controller 70). Each of the determined postcoding matrices is notified to a corresponding user equipment UE via feedback unit 60.

According to the above-stated configuration of the present embodiment, in a MU-MIMO environment in which fixed beamforming is adopted, by using a precoding matrix $P_i$ (i=1 ... $N_U$) determined based on excluded channel matrices $$\tilde{H}_i' = [(H_{1,i})^T, \ldots, (H_{i-1,i})^T (H_{i+1,i})^T, \ldots, (H_{N_U,i})^T]^T$$

which is a set of equivalent channel matrices $H_k W_{Ti} = H_{k,i}$ (k≠i) in which transmit BF weight matrix $W_{Ti}$ of an i-th user is multiplied by each of the channel matrices $H_1, \ldots H_{i-1}, H_{i+1}, \ldots, H_{N_U}$ of users other than the i-th user, matrices $$\begin{bmatrix} H_1 W_{T1} & \cdots & H_1 W_{TN_U} \\ \vdots & \ddots & \vdots \\ H_{N_U} W_{T1} & \cdots & H_{N_U} W_{TN_U} \end{bmatrix}$$

having equivalent channel matrices corresponding to all users (UE-1, ..., UE-$N_U$) as components are subjected to block diagonalization (non-diagonal components corresponding to interference components become zero). As a result, interference control is achieved between MU-MIMO users. Moreover, since each user equipment UE determines whether or not to feed back reception power, the amount of feedback information transmitted to small base station MMNB can be reduced. Further, since feedback information includes determination information indicating whether a reception power is an interference power or a desired power, the processing load for determining a transmit BF weight can be reduced in small base station MMNB.

2. Modifications

The above embodiment may be modified in various ways. Specific modes of modification are exemplified below. Two or more modes chosen from among the embodiments described above and the below exemplifications may be combined, as appropriate, provided that the modes do not contradict one another.

2 (1). First Modification

In the above embodiment, a reception power is fed back from user equipment UE to small base station MMNB, but the present invention is not limited thereto. For example, the information to be fed back is not limited to a value of the reception power. For example, the reception power may be quantized in user equipment UE, and the amount of feedback information may be reduced by feeding back only the index thereof. Specifically, user equipment UE may generate the feedback information including the quantized reception power information indicating the quantized reception power acquired by quantizing the reception power, and determination information indicating whether the reception power is an interference power or a desired power, and feed back the feedback information to small base station MMNB.

Figure 16:
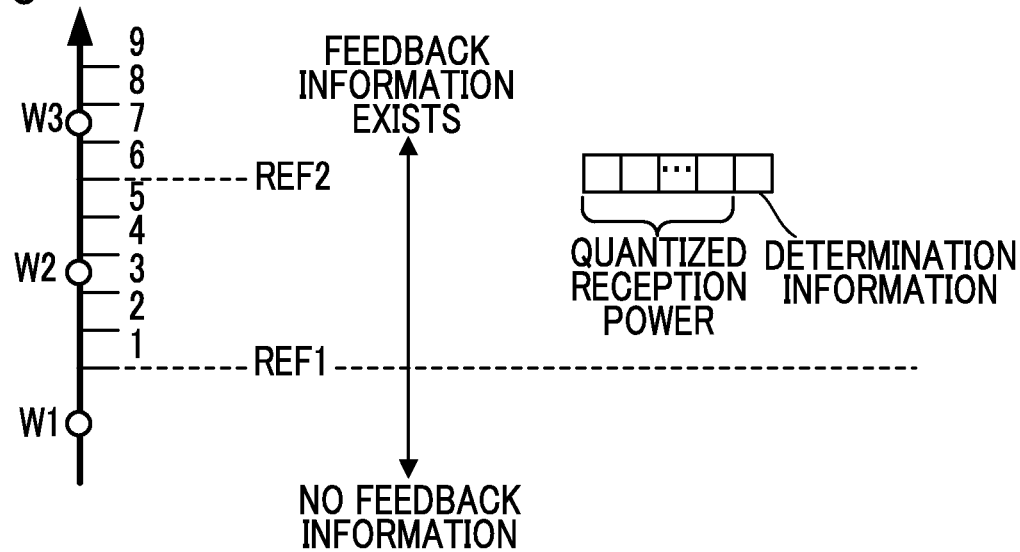
FIG. 16 is a drawing explaining the quantization of reception power according to a modification.

Specifically, as illustrated in FIG. 16, a reception power that is first threshold value REF1 or higher may be quantized in nine stages. The object of comparison with first threshold value REF1 for determining whether or not to carry out feedback may be a reception power, or a quantized reception power. The object of comparison with second threshold value REF2 for determining whether the reception power is a desired power or an interference power may be a reception power, or a quantized reception power. In the example illustrated in the same drawing, when the reception power is W3, the quantized reception power is "7". Since the quantized reception power "7" is higher than second threshold value REF2, the quantized reception power "7" is fed back as a desired power. According to the present modification, the amount of feedback information is reduced, thereby making possible a reduction in the overall system overhead.

2 (2). Second Modification

Figure 17:
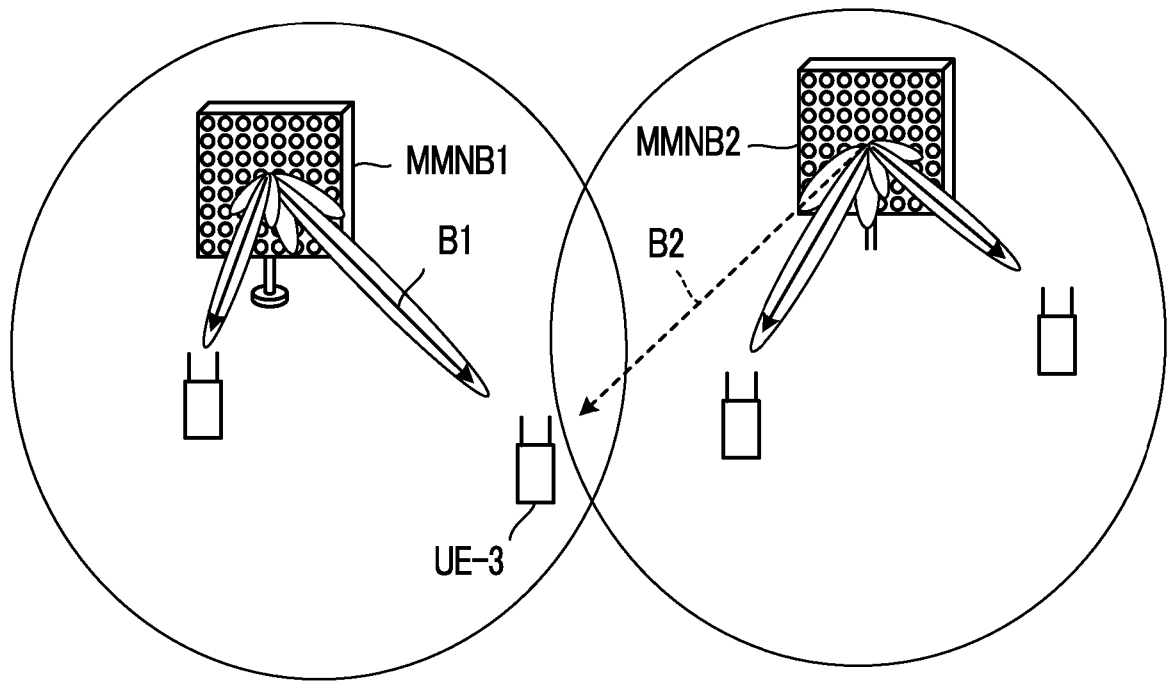
FIG. 17 is a drawing explaining the inter-cell interference according to a modification.

In the embodiment described above, interference power is stated as causing a problem in communication between user equipment UE and one small base station MMNB in which radio communication is established; moreover, user equipment UE sometimes receives interference due to transmission beams from other small base stations MMNB. User equipment UE may generate feedback information as described below, and feed back to a small base station MMNB with which radio communication is established. In the explanation below, a small base station MMNB for which radio communication is established is referred to as first small base station MMNB1, and other small base stations MMNB are referred to as second small base station MMNB2. For example, as illustrated in FIG. 17, user equipment UE-3 is positioned in the vicinity of the boundary between a cell Cmm1 of first small base station MMNB1 and a cell Cmm2 of second small base station MMNB2. In such a case, user equipment UE-3 receives a desired beam B1 from first small base station MMNB1, while receiving an interference beam B2 from second small base station MMNB2.

First, before first small base station MMNB1 transmits a plurality of candidate beams and carries out beam searching, measurer 180 measures the other-cell interference power of a transmission beam (in the present example, interference beam B2) transmitted from second small base station MMNB2.

Next, comparer 190 compares third threshold value REF3 with the other-cell interference power, and outputs the comparison result to feedback unit 200. If the other-cell interference power is third threshold value REF3 or higher, feedback unit 200 transmits, to first small base station MMNB1, feedback information including the other-cell interference information indicating interference from second small base station MMNB2. Meanwhile, if the other-cell interference power is less than third threshold value REF3, feedback unit 200 transmits no feedback information to first small base station MMNB1. Operation of user equipment UE when no feedback information is transmitted to first small base station MMNB1 is similar to that in the embodiment described above, whereby, if a plurality of candidate beams are transmitted from first small base station MMNB1, user equipment UE determines whether or not to transmit feedback information based on the reception power, and if it is going to perform feedback, user equipment UE transmits feedback information including determination information indicating whether the reception power is an interference power or a desired power.

Here, the other-cell interference information may preferably include information for identifying second small base station MMNB2, and information for identifying a transmission beam (in the present example, interference beam B2) from second small base station MMNB2, which is the cause of interference. Moreover, the feedback information may preferably include other-cell interference power information indicating other-cell interference power.

First small base station MMNB1, which has received this feedback information, may preferably carry out inter-cell interference control in coordination with second small base station MMNB2. Third threshold value REF3 is set to a value to determine whether or not the influence of the transmission beams from second small base station MMNB2 on communication quality can be ignored, and is stored in storage unit 210. Third threshold value REF3 may be set independently of the above-stated first threshold value REF1 and second threshold value REF2. Third threshold value REF3 may be first threshold value REF1 or higher, for example.

As another mode for user equipment UE, first, measurer 180 may be configured to, before first small base station MMNB1 transmits a plurality of candidate beams and carries out beam searching, measure the other-cell interference power for transmission beams transmitted from second small base station MMNB2.

Next, comparer 190 compares third threshold value REF3 with the other-cell interference power, and outputs the comparison result to feedback unit 200. If the other-cell interference power is third threshold value REF3 or higher, feedback unit 200 modifies the feedback information when feeding back information on a plurality of candidate beams to first small base station MMNB1. Specifically, feedback unit 200 generates feedback information including a corrected reception power pertaining to a reception power corrected according to other-cell interference, in place of reception power information, and transmits the feedback information to first small base station MMNB1. Here, the corrected reception power information may be the corrected reception power itself, or may be information on which corrected reception power is quantized. The reception power fed back as a desired power is preferably corrected to smaller power as the other-cell interference power increases. By carrying out a correction as such, transmit BF weight is adjusted in first small base station MMNB1 and, as a result, radio quality maintained. This process enables an increase in desired beam gain with respect to the user equipment UE even in the presence of other-cell interference power.

2 (3). Third Modification

Figure 18:
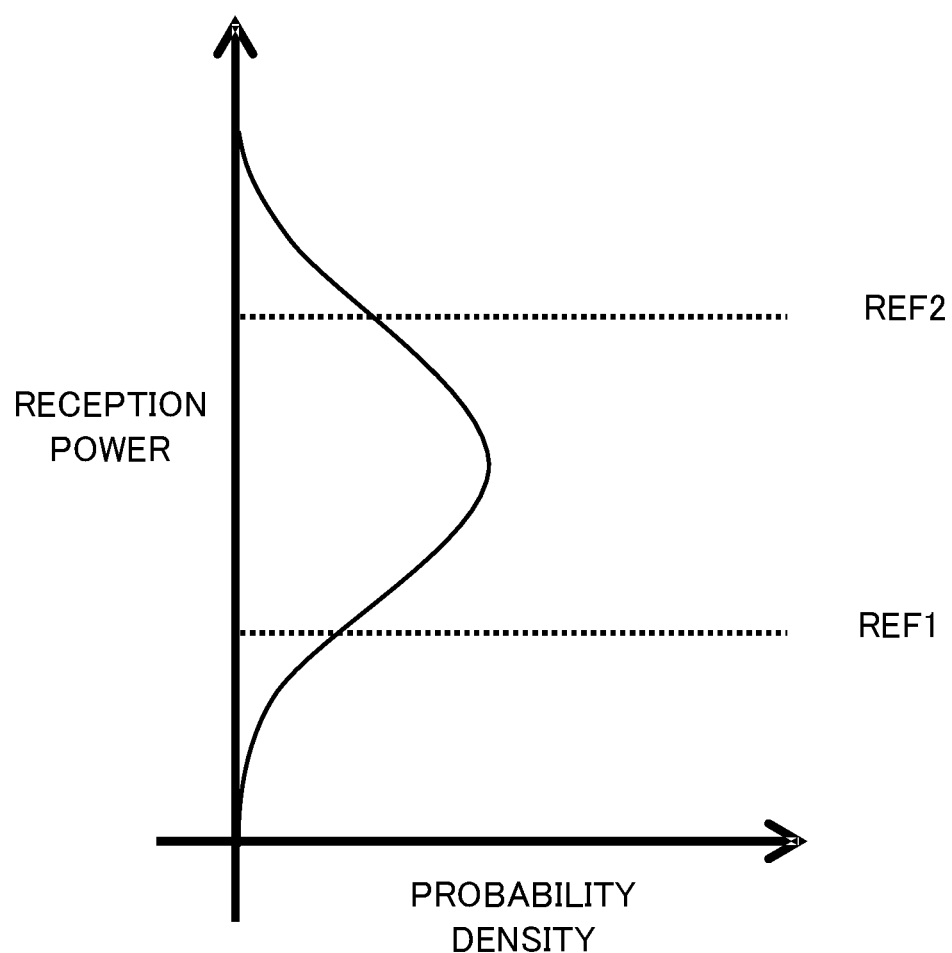
FIG. 18 is a drawing illustrating the relationship between reception power and probability density according to a modification.

In the embodiment described above, first threshold value REF1 and second threshold value REF2 are stored in storage unit 210, but these threshold values may be set by choice for each user equipment UE. The threshold values may be set according to a command from small base station MMNB, or set independently in user equipment UE. FIG. 18 illustrates one example of relationship between reception power and probability density. Here, if second threshold value REF2 is lowered, the number of beams from among the plurality of candidate beams fed back as desired beams is increased. Therefore, BF gain can be increased. Meanwhile, if second threshold value REF2 is increased, the number of beams from among the plurality of candidate beams fed back as interference beams is increased. Therefore, interference control can be strengthened in small base station MMNB.

Here, user equipment UE may include a setter for setting second threshold value REF2, which is the number of candidate beams to which feedback information pertaining to desired power applies is at least a number corresponding to a desired communication speed. By this configuration, user equipment UE can control BF gain according to the desired communication speed. The processing load in small base station MMNB can be reduced. User equipment UE may comprise a setter for setting first threshold value REF1 and/or second threshold value REF2 according to the average reception power. Moreover, user equipment UE may comprise a setter for setting first threshold value REF1 and/or second threshold value REF2 to control interference, according to the distribution of reception power.

2 (4). Fourth Modification

In the embodiment described above, transmission/reception characteristic estimator 150 estimates an equivalent channel matrix by using an input reference signal RS, but the present invention is not limited thereto. For example, a transmit BF weight matrix may be determined after the channel matrix instead of the equivalent channel matrix has been estimated. In such a case, user equipment UE may quantize the estimated channel matrix, to feed it back to small base station MMNB. In the embodiment described above, user equipment UE feeds back the elements of an equivalent channel matrix, but user equipment UE may quantize these elements before feedback. Quantizing channel matrix and equivalent channel matrix results in reduction of an amount of feedback information.

2 (5). Fifth Modification

In the embodiments described above, the number $L_{T_i}$ of transmission beams of a certain user (i-th user) is set in a fixed manner (for example, $L_{T_i}=L_T/N_U$). However, the number $L_{T_i}$ of transmission beams may be set in a dynamic manner. For example, the number $L_{T_i}$ of transmission beams may be set to a number that makes the communication speed of an i-th user a set value or higher; or may be set to a value that improves the overall communication speed of the system, preferably to a value that maximizes the communication speed. Alternatively, the number $L_{T_i}$ of transmission beams may be set to a value that improves the communication speed compared to when the number $L_{T_i}$ of transmission beams is set in a fixed manner; or may be set to a value that increases the capacity of the i-th user, preferably to a value that maximizes the capacity of the i-th user. For example, the number $L_{T_i}$ of transmission beams is preferably set according to an MCS (Modulation and Coding Scheme) value.

According to the above-stated configuration, it is possible to accommodate differences in quality required for each user in a flexible manner. It is also possible to improve the overall communication speed of the system, while ensuring equality of communication speed between users.

2 (6). Sixth Modification

In the embodiments described above, communication of control information between small base station MMNB and user equipment UE can be carried out on a route of choice. For example, when a radio link is established between small base station MM NB and user equipment UE, control information may be exchanged by directly transmitting/receiving radio signals. If the above-stated radio link is not established, small base station MMNB and user equipment UE may transmit/receive control information via macro base station MeNB.

2 (7). Seventh Modification

Transmission beamformer 54 in small base station MMNB may have a full-array configuration in which a single transmission beam is generated using all of $N_T$ transmission antennas $A_T$, and alternatively, may have a sub-array type configuration in which in which a single transmission beam is generated using $(N_T/L_T)$ transmission antennas $A_T$. Either configuration achieves user multiplexing as in the above-described embodiment.

2 (8). Eighth Modification

User equipment UE is a device of choice capable of radio communication with a base station (macro base station MeNB and/or small base station MMNB) within a network. User equipment UE may be a mobile telephone terminal such as a feature phone or a smartphone, a tablet terminal, a desktop PC, a notebook PC, an ultra-mobile personal computer (UMPC), a portable gaining device, or some other type of radio terminal, for example. User equipment UE may employ the above-stated communication not only for radio communication with small base station MMNB but also for radio communication with any base station.

2 (9). Ninth Modification

Each of the functions carried out by the CPU in each of the elements (user equipment UE and small base station MMNB) within communication system 1 may be carried out by hardware in place of a CPU, or may be carried out by a programmable logic device such as a field programmable gate array (FPGA) or a digital signal processor (DSP), for example.

DESCRIPTION OF THE REFERENCE SIGNS

1 . . . radio communication system, MMNB . . . small base station, 10 . . . data signal generator, 20 . . . reference signal generator, 30 . . . baseband processor, 32 . . . precoder, 40 . . . converter, 50 . . . processor, 52 . . . up-converter, 54 . . . transmission beamformer, 60, 200 . . . feedback unit, 70 . . . precoding controller, 80 . . . transmit BF weight controller, 90 . . . storage unit, UE . . . user equipment, 110 . . . processor, 112 . . . reception beamformer, 114 . . . down-converter, 120 . . . converter, 130 . . . baseband processor, 132 . . . postcoder, 140 . . . signal analyzer, 150 . . . transmission/reception characteristic estimator, 160 . . . receive BF weight controller, 170 . . . postcoding controller, 180 . . . measurer, 190 . . . comparer, 200 . . . feedback unit, 210 . . . storage unit, AA . . . amplitude adjuster, $AC_R$ . . . analog signal processing circuit, $AC_T$ . . . analog signal processing circuit, AD . . . adder, $A_R$ . . . reception antenna, $A_T$ . . . transmission antenna, Cm . . . macro cell, Cmm Massive-MIMO cell, $DC_R$ . . . digital signal processing circuit, $DC_T$ . . . digital signal processing circuit, MME . . . central control station, MP . . . multiplier, MeNB . . . macro base station, $PC_R$ . . . processing circuit, $PC_T$ . . . processing circuit, PS . . . variable phase shifter.

The invention claimed is:

1. A user equipment for receiving a plurality of candidate beams for transmit beamforming, which are transmitted from a base station that carries out radio communication by using an MU-MIMO transmission scheme, the user equipment comprising:
   a measurer configured to measure a benchmark pertaining to communication quality for each of the plurality of candidate beams;
   a comparer configured to compare the benchmark with a first threshold value and a second threshold value that is greater than the first threshold value; and
   a feedback unit configured to transmit the benchmark to the base station as feedback information pertaining to an interference beam if the benchmark is the first threshold value or higher and lower than the second threshold value, transmit the benchmark to the base station as feedback information pertaining to a desired beam if the benchmark is the second threshold value or higher, and transmit no feedback information to the base station if the benchmark is lower than the first threshold value, based on the comparison results of the comparer.

2. The user equipment according to claim 1, wherein
   the benchmark pertaining to the transmission quality is reception power,
   the measurer measures reception power for each of the plurality of candidate beams,
   the comparer compares the reception power with each of the first threshold value and the second threshold value, and
   the feedback unit transmits the reception power to the base station as feedback information pertaining to an interference beam if the reception power is the first threshold value or higher and lower than the second threshold value, transmits the reception power to the base station as feedback information pertaining to a desired beam if the reception power is the second threshold value or higher, and transmits no feedback information to the base station if the benchmark is lower than the first threshold value, based on the comparison results of the comparer.

3. The user equipment according to claim 2, wherein
   the feedback unit generates the feedback information including determination information indicating whether the reception power is an interference power or a desired power, and reception power information indicating the reception power.

4. The user equipment according to claim 2, wherein
   the feedback unit generates feedback information including determination information indicating whether the reception power is an interference power or a desired power, and quantized reception power information in which the reception power has been quantized.

5. The user equipment according to claim 1, wherein
   the measurer measures other-cell interference power for transmission beams transmitted from a different base station from the aforementioned base station, before the base station transmits the plurality of candidate beams,
   the comparer compares a third threshold value with the other-cell interference power, and
   the feedback unit transmits, to the base station, the feedback information including other-cell interference information indicating the presence of interference from the different base station if the other-cell interference power is the third threshold value or higher.

6. The user equipment according to claim 2, wherein
   the measurer measures other-cell interference power for transmission beams transmitted from a different base station from the aforementioned base station, before the base station transmits the plurality of candidate beams,
   the comparer compares a third threshold value with the other-cell interference power, and
   the feedback unit transmits, to the base station, the feedback information including amended reception power information pertaining to reception power amended according to the other-cell interference power, in place of the reception power information, if the other-cell interference power is the third threshold value or higher.

7. The user equipment according to claim 1, further comprising
   a setter configured to set a second threshold value to a value that is the number of candidate beams to which feedback information pertaining to the desired power applies is at least a number corresponding to a desired communication speed.

8. The base station that is radio communicable with a plurality of the user equipments, each of which is a user equipment according to claim 1, by using an MU-MIMO transmission scheme, the base station comprising:
   a precoder configured to carry out digital precoding with respect to M (M is an integer of 2 or higher) by using a precoding weight matrix;
   a transmission beamformer configured to subject a signal, which has been subjected to the digital precoding, to analog transmit beamforming that imparts variation in phase and amplitude corresponding to a transmit beamforming weight matrix, or time region digital transmit beamforming;
   a plurality of antennas for transmitting signals that have been subjected to the transmit beamforming, and receiving the feedback information transmitted from each of the plurality of the user equipments; and
   a transmit beamforming weight controller configured to control the transmission beamformer,
   wherein the transmit beamforming weight controller selects a transmit beamforming weight matrix corresponding to each of the plurality of candidate beams, to make the transmission beamformer carry out transmit beamforming that imparts variation in phase and amplitude corresponding to the selected transmit beamforming weight matrix, and determines a transmit beamforming weight matrix for transmitting M streams based on the feedback information corresponding to each of the plurality of the user equipments, to make the transmission beamformer carry out analog transmit beamforming that imparts variation in phase and amplitude corresponding to the determined transmit beamforming weight matrix.

9. The base station according to claim 8, wherein
   the transmission beamformer subjects a reference signal to transmit beamforming that imparts variation in phase and amplitude corresponding to the determined transmit beamforming weight matrix and outputs the signal, and
   the base station further comprises a precoding controller configured to acquire the precoding weight matrix based on the equivalent channel matrix if equivalent channel information including an equivalent channel matrix in which the transmit beamforming weight matrix generated by using the reference signal is multiplied by a channel matrix indicating propagation characteristics of a transmission path, is received from each of the plurality of user equipments.

* * * * *